United States Patent
Zhang et al.

(10) Patent No.: US 12,499,524 B2
(45) Date of Patent: Dec. 16, 2025

(54) ENHANCEMENT OF MEDICAL IMAGES

(71) Applicant: Oxford University Innovation Limited, Oxford (GB)

(72) Inventors: Qiang Zhang, Oxford (GB); Stefan Piechnik, Oxford (GB); Vanessa Ferreira, Oxford (GB); Evan Hann, Oxford (GB); Iulia Andreia Popescu, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 589 days.

(21) Appl. No.: 17/639,926

(22) PCT Filed: Sep. 4, 2020

(86) PCT No.: PCT/GB2020/052117
§ 371 (c)(1),
(2) Date: Mar. 3, 2022

(87) PCT Pub. No.: WO2021/044153
PCT Pub. Date: Mar. 11, 2021

(65) Prior Publication Data
US 2022/0343475 A1    Oct. 27, 2022

(30) Foreign Application Priority Data

Sep. 4, 2019 (GB) .................................... 1912701

(51) Int. Cl.
*G06T 5/92*    (2024.01)
*A61B 5/00*    (2006.01)
(Continued)

(52) U.S. Cl.
CPC ............... *G06T 5/92* (2024.01); *A61B 5/055* (2013.01); *G06T 5/50* (2013.01); *A61B 5/0044* (2013.01);
(Continued)

(58) Field of Classification Search
CPC . G06T 2207/20084; G06T 2207/20081; G06T 2207/10081; G06T 2207/10088;
(Continued)

(56) References Cited

U.S. PATENT DOCUMENTS 10,628,930 B1 *  4/2020  Periaswamy ........ A61B 6/5235
2017/0061620 A1   3/2017  Park et al.
(Continued)

FOREIGN PATENT DOCUMENTS

CN       108090871 A1    5/2018
WO       2019/074938 A1  4/2019

OTHER PUBLICATIONS

Kim, Wook, et al. "Contrast CT image generation model using CT image of PET/CT." 2018 IEEE Nuclear Science Symposium and Medical Imaging Conference Proceedings (NSS/MIC). IEEE, 2018. (Year: 2018).*
(Continued)

*Primary Examiner* — Michael Horabik
*Assistant Examiner* — Stefano Anthony Dardano
(74) *Attorney, Agent, or Firm* — Thomas|Horstemeyer, LLP

(57) ABSTRACT

A method and apparatus for enhancing magnetic resonance images to produce contrast-enhanced images without the need to administer contrast agent to a patient. The image processing apparatus utilises a trained machine learning algorithm as an image processor, preferably a generative adversarial network, to produce images from contrast agent-free magnetic resonance images with the produced images
(Continued)

having similar appearance and better image quality and better pathological sensitivity and being able to differentiate more pathological conditions than actually acquired contrast-enhanced images.

18 Claims, 17 Drawing Sheets

(51) Int. Cl.
    *A61B 5/055*     (2006.01)
    *G06T 5/50*     (2006.01)
(52) U.S. Cl.
    CPC ............... *G06T 2207/10081* (2013.01); *G06T 2207/10088* (2013.01); *G06T 2207/10104* (2013.01); *G06T 2207/10108* (2013.01); *G06T 2207/10116* (2013.01); *G06T 2207/10132* (2013.01); *G06T 2207/20081* (2013.01); *G06T 2207/20084* (2013.01); *G06T 2207/20212* (2013.01); *G06T 2207/30048* (2013.01)
(58) Field of Classification Search
    CPC ... G06T 2207/30004; G06T 5/50; G06T 5/60; G06T 11/00; G06T 2207/10104–10116; G06T 2207/30016–30048; G06T 3/04; G06T 3/60; G06T 5/92; G06T 7/0002; G06T 7/0012; G06T 7/20; G06T 7/50; G06T 7/60; G06V 10/774–778; G06V 2201/03; G01R 33/5601; G01R 33/5608; A61B 5/0044; A61B 5/055; A61B 6/032; A61B 6/481; A61B 6/484; A61B 6/486; A61B 6/487; A61B 6/5217
    See application file for complete search history.

(56) References Cited

U.S. PATENT DOCUMENTS

2019/0108634 A1*   4/2019   Zaharchuk ............. G06N 3/084
2019/0122348 A1*   4/2019   Jensen ................... G16H 50/50
2019/0150764 A1*   5/2019   Arnold .................. G06V 10/82

OTHER PUBLICATIONS

Schelbert, Erik B., and Daniel R. Messroghli. "State of the art: clinical applications of cardiac T1 mapping." Radiology 278.3 (2016): 658-676. (Year: 2016).*
International Search Report and Written Opinion for WO 2021/044153 (PCT/GB2020/052117), dated Nov. 10, 2020, pp. 1-13.
UK Search Report for GB 1912701.8, dated Mar. 5, 2020, pp. 1-3.
Jiang Liu, Enhao Gong, Thomas Christen, and Greg Zaharchuk: "Contrast-free MRI Contrast Enhancement with Deep Attention Generative Adversarial Network", International Society for Magnetic Resonance in Medicine, I SMRM, 2030 Addison Street, 7th Floor, Berkeley, CA 94704 USA, No. 1091, Apr. 26, 2019 (Apr. 26, 2019), pp. 1-3.
Thomas Christen, Enhao Gong, Jia Guo, Michael M. Moseley, and Greg Zaharchuk: "Predicting Contrast Agent Enhancement with Deep Convolution Networks", International Society for Magnetic Resonance in Medicine, ISMRM, 2030 Addison Street, 7th Floor, Berkeley, CA 94704 USA, No. 3493, Jun. 1, 2018 (Jun. 1, 2018), pp. 1-5.
Ferreira et al. "Native T1-mapping detects the location, extent and patterns of acute myocarditis without the need for gadolinium contrast agents", J Cardiovasc Magn Reson 16, 36 (2014).
Dass et al., "Myocardial Tissue Characterization Using Magnetic Resonance Noncontrast T1 Mapping in Hypertrophic and Dilated Cardiomyopathy", Cardiovascular Imaging. 2012;5:726-733.
Abdula et al, "Synthetic late gadolinium enhancement cardiac magnetic resonance for diagnosing myocardial scar", Scandinavian Cardiovascular Journal, 52:3, 127-132.
Ben-Cohen et al. "Cross-Modality Synthesis from CT to PET using FCN and GAN Networks for Improved Automated Lesion Detection", Engineering Applications of Artificial Intelligence, vol. 78, Feb. 2019, pp. 186-194.
Scully et al. Myocardial Extracellular Volume Quantification by Cardiovascular Magnetic Resonance and Computed Tomography, Current Cardiology Reports (2018) 20: 15.
Xiang et al. Deep embedding convolutional neural network for synthesizing CT image from T1-Weighted image, Medical Image Analysis (2018) 31-44.
Nie et al. Estimating CT Image from MRI Data Using 3D Fully Convolutional Networks, Deep Learn Data Label Med Appl (2016) 170-178.
Han. "MR-based synthetic CT generation using a deep convolutional neural network method" Med Phys Apr. 2017;44(4):1408-1419.
Weber, W., Grosu, A. & Czernin, J. "Technology Insight: advances in molecular imaging and an appraisal of PET/CT scanning". Nat Rev Clin Oncol 5, 160-170 (2008).
Kim RJ, Wu E, Rafael A, Chen EL, Parker MA, Simonetti O, Klocke FJ, Bonow RO, Judd RM. The use of contrast-enhanced magnetic resonance imaging to identify reversible myocardial dysfunction. N Engl J Med. Nov. 16, 2000;343(20):1445-53.
S. U. Dar, M. Yurt, L. Karacan, A. Erdem, E. Erdem and T. çukur, "Image Synthesis in Multi-Contrast MRI With Conditional Generative Adversarial Networks," in IEEE Transactions on Medical Imaging, vol. 38, No. 10, pp. 2375-2388, Oct. 2019, doi: 10.1109/TMI.2019.2901750.
P. Isola, J. Zhu, T. Zhou and A. A. Efros, "Image-to-Image Translation with Conditional Adversarial Networks," 2017 IEEE Conference on Computer Vision and Pattern Recognition (CVPR), 2017, pp. 5967-5976.
Messroghli DR, Moon JC, Ferreira VM, Grosse-Wortmann L, He I, Kellman P, Mascherbauer J, Nezafat R, Salerno M, Schelbert EB, Taylor AJ, Thompson R, Ugander M, van Heeswijk RB, Friedrich MG. Clinical recommendations for cardiovascular magnetic resonance mapping of T1, T2, T2* and extracellular vol. A consensus statement by the Society for Cardiovascular Magnetic Resonance (SCMR) endorsed by the European Association for Cardiovascular Imaging (EACVI). J Cardiovasc Magn Reson. Oct. 9, 2017;19(1):75.
Ting-Chun Wang, Ming-Yu Liu, Jun-Yan Zhu, Andrew Tao, Jan Kautz, Bryan Catanzaro, "High-Resolution Image Synthesis and Semantic Manipulation with Conditional GANs", arXiv:1711.11585v1 [cs.CV] Nov. 30, 2017.
Taylor AJ, Salerno M, Dharmakumar R, Jerosch-Herold M. T1 Mapping: Basic Techniques and Clinical Applications. JACC Cardiovasc Imaging. Jan. 2016;9(1):67-81. doi: 10.1016/j.jcmg.2015.11.005. PMID: 26762877.
Jun-Yan Zhu, Taesung Park, Phillip Isola, Alexei A. Efros, "Unpaired Image-to-Image Translation using Cycle-Consistent Adversarial Networks", arXiv:1703.10593v6 [cs.CV] Nov. 15, 2018.
International Preliminary Report on Patentability for WO 2021/044153 (PCT/GB2020/052117), dated Mar. 8, 2022, pp. 1-10.

* cited by examiner

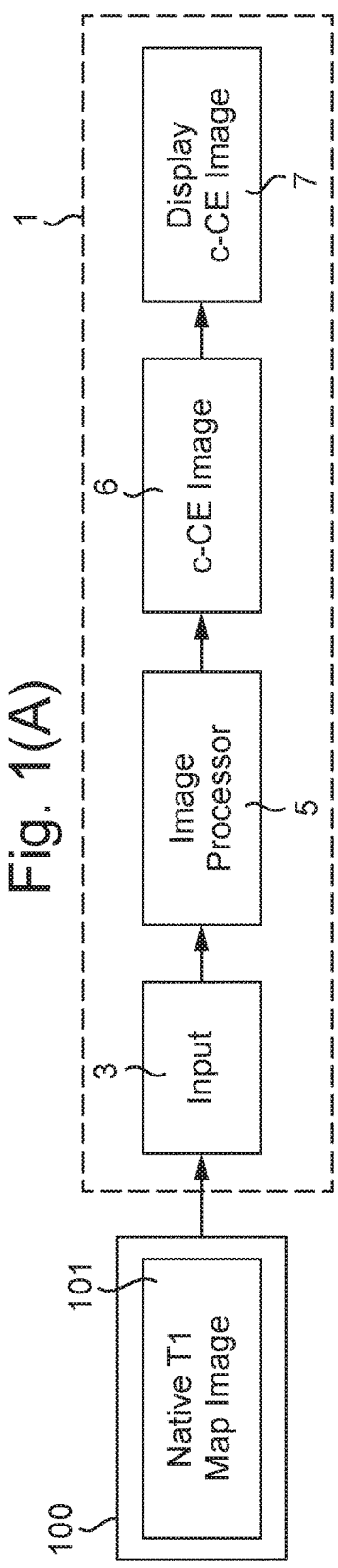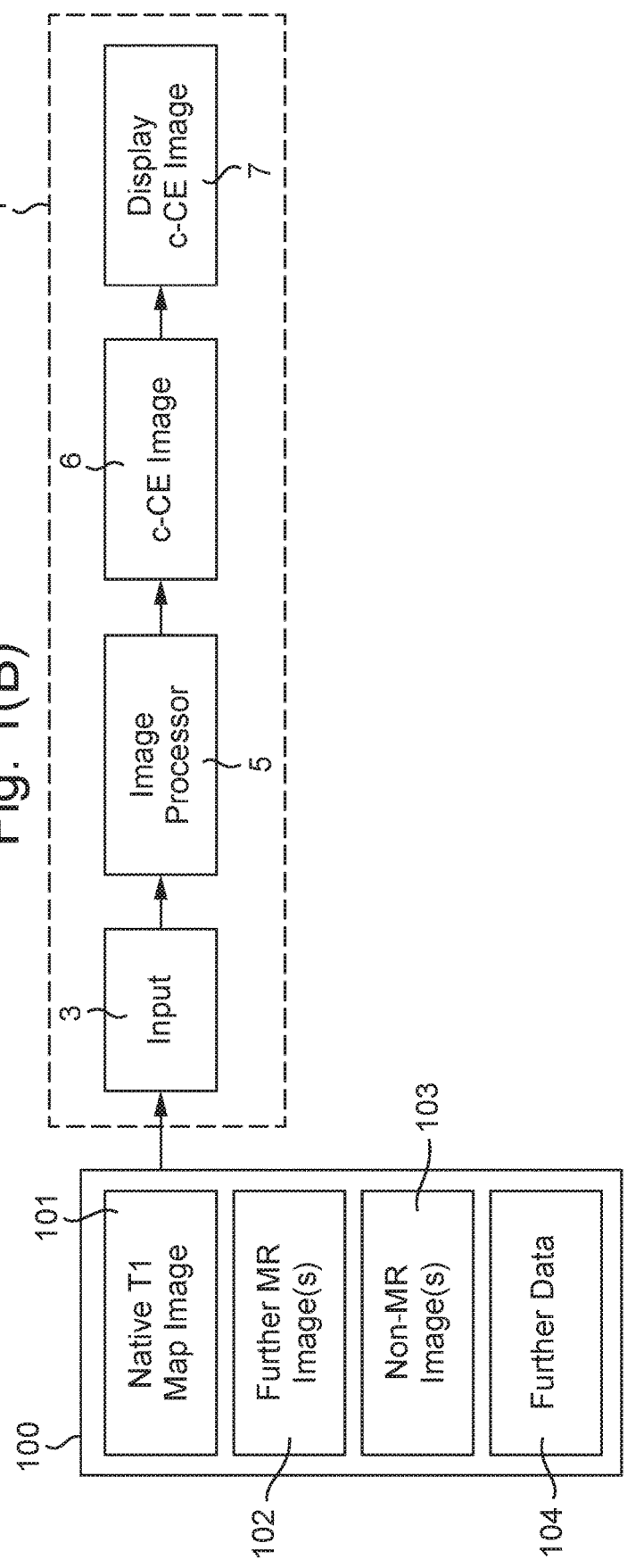

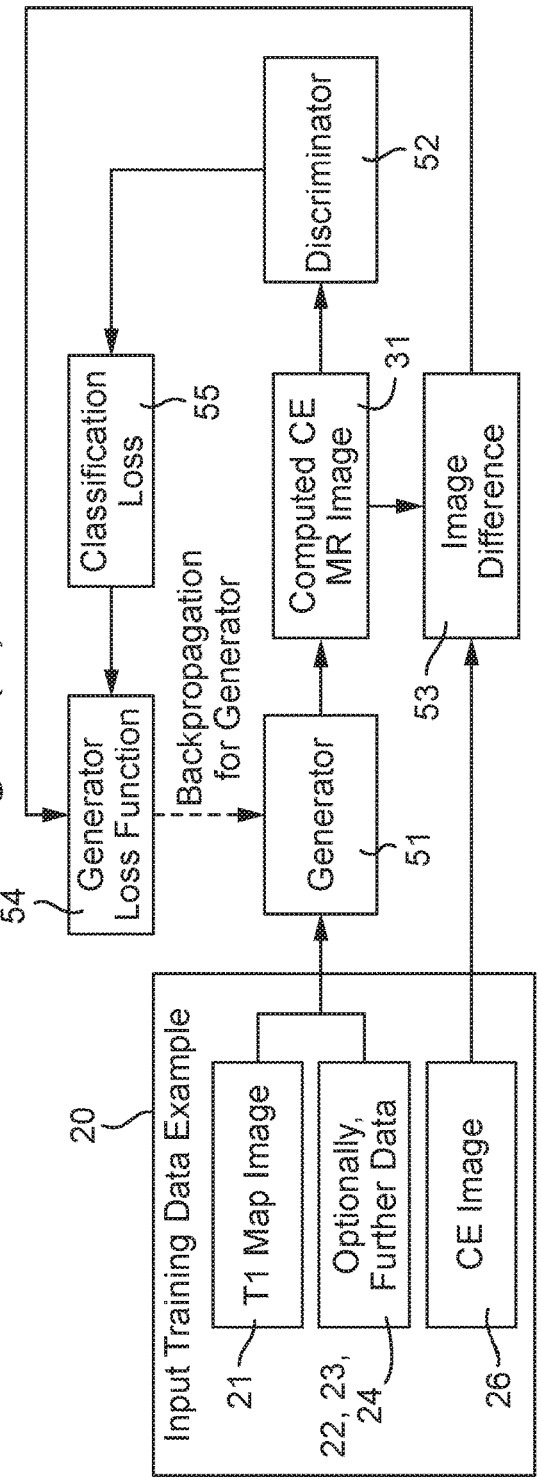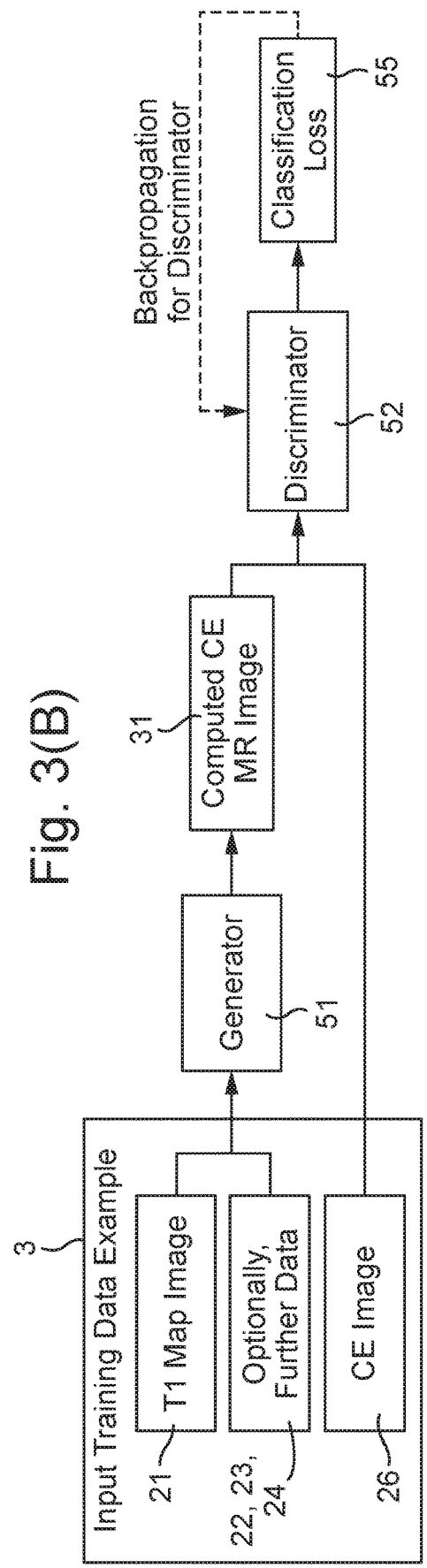

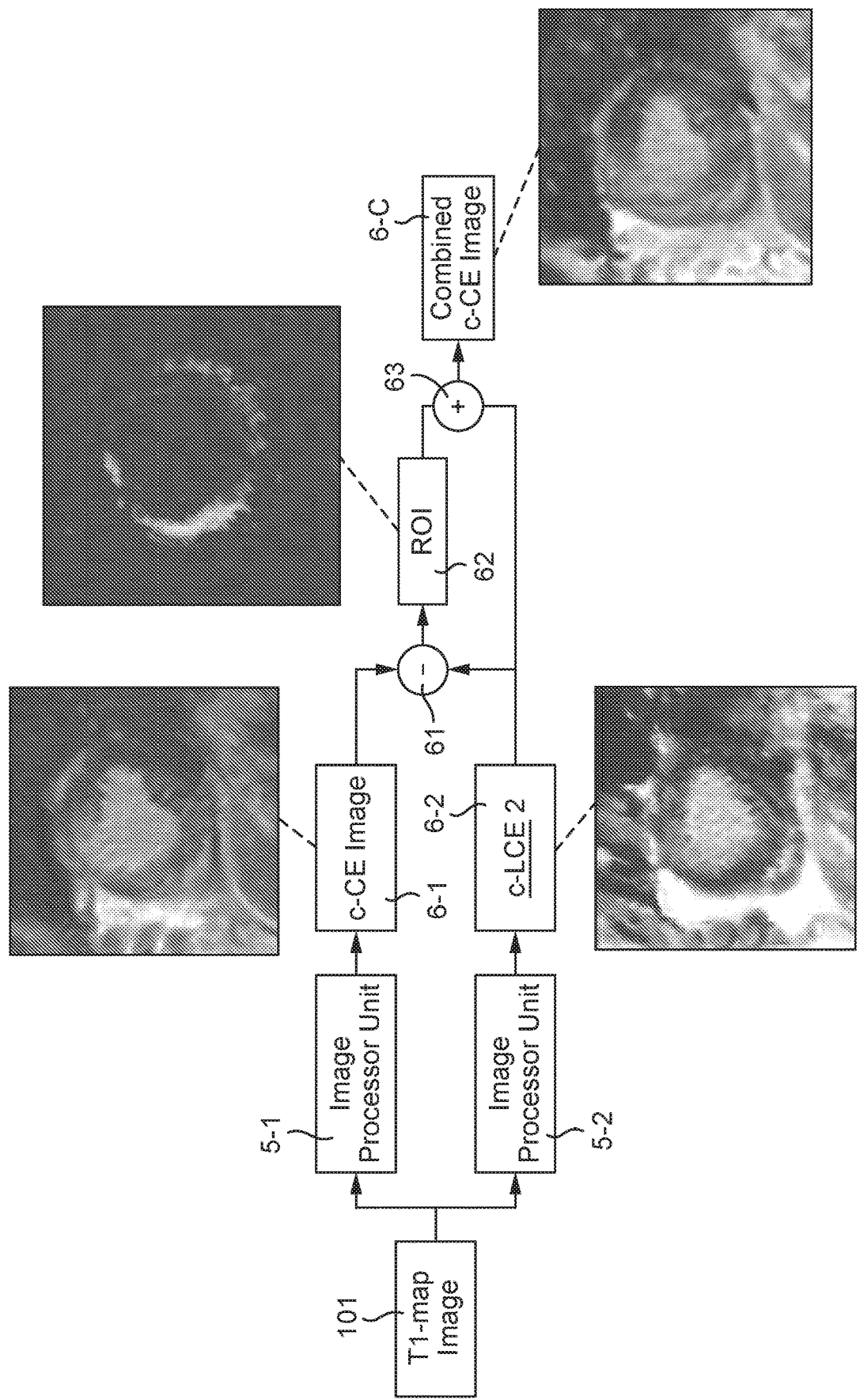

Fig. 16
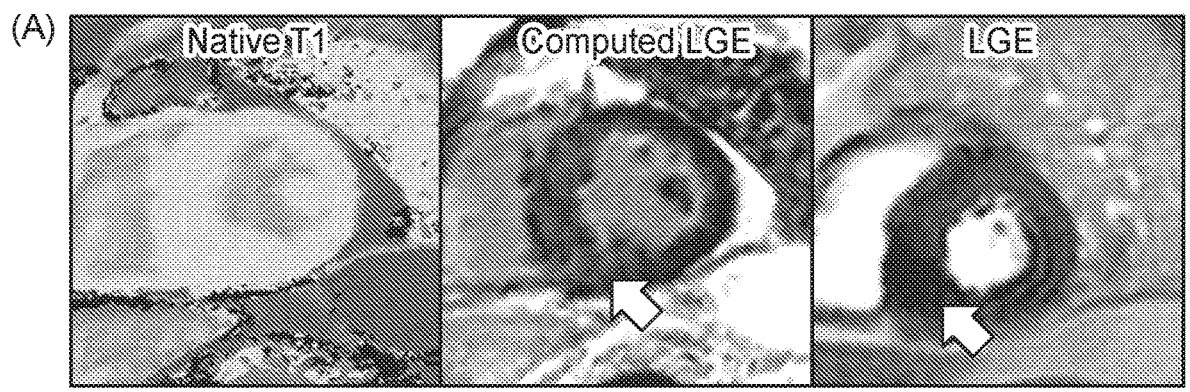
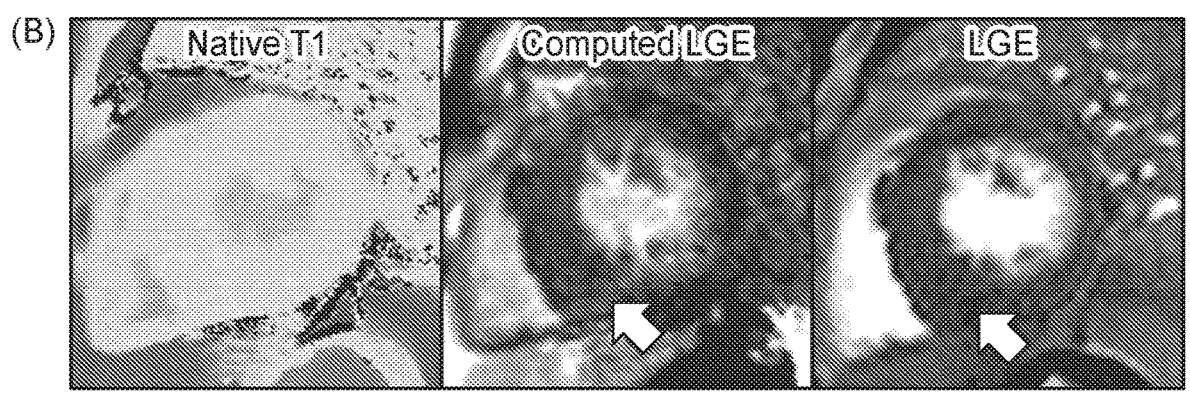
Fig. 17
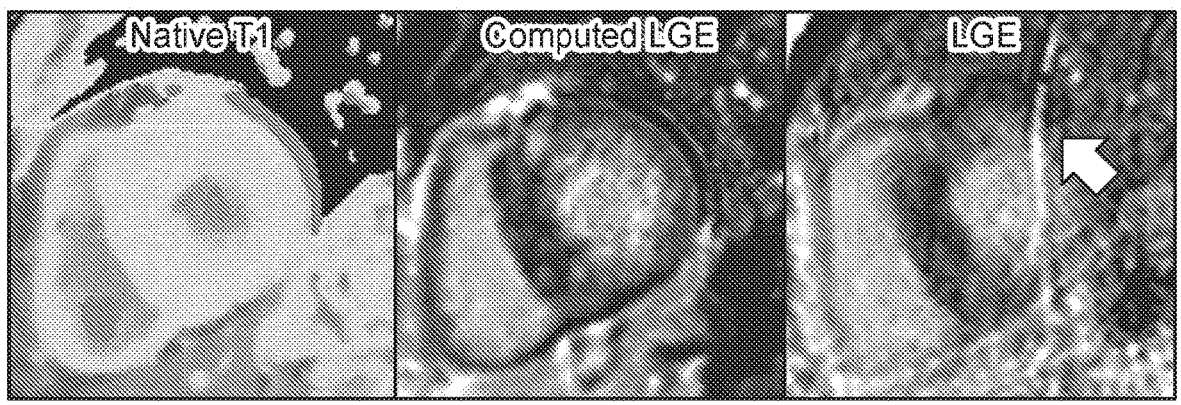

ENHANCEMENT OF MEDICAL IMAGES

CROSS-REFERENCE TO RELATED APPLICATIONS

This application is the National Stage of International Application No. PCT/GB2020/052117, filed Sep. 4, 2020, which claims priority to GB 1912701.8, filed Sep. 4, 2019, which are entirely incorporated herein by reference.

The present invention relates to a method and apparatus for producing improved computed contrast-enhanced medical images from dedicated quantitative imaging datasets without any reliance on injectable contract agents.

Medical imaging is a ubiquitous technique for assisting clinicians by forming images of a patient's anatomy and of physiological processes within the patient's body. There are a wide variety of medical imaging techniques or modalities, such as X-ray or computed tomography (CT) imaging, nuclear medical imaging, such as positron-emission tomography (PET) or single-photon emission computerized tomography (SPECT), and magnetic resonance (MR) imaging (MRI).

The present invention concerns MRI. Typically, an MR image is a two-dimensional display of the contrast arising from differences in multiple magnetic properties of the patient's tissue. Many different types of MRI sequence or "modality", such as T1-weighted, T2-weighted or T2*-weighted MRI, are well-known. These sequences are routinely pre-programmed into MRI scanners and use different combinations of static and oscillating magnetic fields and radio-frequency (RF) pulses, and the effect is that the contrast in the resulting images depends more heavily on the desired modality (T1 or T2 for example) and selection of parameters. In addition to the MR imaging modalities mentioned above, other known modalities are fat-water imaging, double inversion recovery T2-weighted imaging, STIR (short-tau inversion recovery) T2-weighted imaging, tagged-CMR (cardiovascular magnetic resonance) imaging, strain-encoded imaging, diffusion-weighted imaging, diffusion tensor imaging, and arterial spin labelling imaging. Further, in cardiac MRI, so-called "cine images" can be obtained by imaging a patient over a number of heartbeats to produce a stack of images which can be formed into frames of a video image showing the heart beating, flow of blood and other types of motion.

An important development in medical imaging has been the introduction of contrast-enhanced (CE) imaging in which images are obtained after administration to the patient of a contrast agent. In such images the contrast in the image reflects location of the contrast agent and can enhance differentiation between tissues. Further, the contrast in the image can reflect the wash-in and wash-out of the contrast agent and thus give additional pharmacokinetic information on the pathophysiology of the patient's tissues. Contrast agents may be used with X-ray (CT) imaging and MR imaging, and nuclear medical imaging inherently involves the administration of radiotracers which may be regarded for these purposes as a contrast agent producing contrast-enhanced images.

In cardiac MR imaging a paramagnetic contrast agent such as a gadolinium-based contrast agent (GBCA) is typically used. The most common uses of GBCA include first pass perfusion, early gadolinium enhancement (EGE), late gadolinium enhancement (LGE) imaging, and angiographic studies. In particular, LGE imaging has become the gold standard in clinical cardiology for assessing the viability of the heart muscle, and for distinguishing ischaemic from non-ischaemic heart disease. This can affect clinical decision-making of whether patients need to have invasive procedures (such as open heart-surgery or invasive percutaneous coronary intervention (PCI) to open up blockages in the coronary arteries, or simpler, non-invasive treatments). Clinicians have become very familiar with interpreting CE MR images and so prefer to see such CE medical images readily to help them in diagnosing a variety of medical conditions. Combining the results of CE and contrast agent-free imaging allow the calculation of other quantities of interest such as extracellular volume (ECV), salvageable area-at-risk in acute myocardial infarction, viable myocardium, etc.

However, CE imaging typically requires intravenous cannulation and administration of contrast agents into the subject, which not only is invasive, but also prolongs scan procedure, in the case of LGE imaging to typically over 45 minutes. Long scan procedures make it difficult for the subject to remain still—a requirement for good quality images, but also decreases patient tolerability inside the scanner. Further, in some applications, such as cardiac MRI, the subject's heartbeat and ability to breath-hold may significantly limit the clinically-acceptable duration for the sequence.

Contrast agents may also be contraindicated in certain classes of patients (e.g. those with significant kidney failure who cannot effectively excrete the contrast and may develop a serious and irreversible complication nephrogenic systemic fibrosis). Contrast agents such as GBCA may be less desirable in others (e.g. women who are pregnant or breast-feeding, and children). For example, recently, evidence of GBCA accumulation in the brains of patients who had undergone multiple MRI examinations has been published, with unclear prognosis on the clinical significance of these brain accumulations. Many patients require serial examinations for monitoring of disease and response to treatment, so the potential risks of complications can mount substantially. GBCA is given as an example, and there are similar limitations with regards to other contrast agents such as iron oxide, manganese in MRI, iodinated contrast in CT, etc.

Despite these difficulties, CE medical imaging is routinely used in clinical practice. For example, LGE has been traditionally considered to contain crucial and irreplaceable information for differential diagnosis, and hence GBCA is administered routinely despite the additional cost, risks (although small) and the burden to patients. Due to the ubiquity of the LGE, many clinical practitioners can recognise LGE images and assign observed patterns to specific disease presentations.

Traditionally, interest in MRI images was confined to the variation in contrast across an image, rather than the absolute values of the magnetic parameter (T1 or T2), but more recently MRI sequences have been used which enable quantitative mapping of the specific underlying magnetic properties of the substances, such as T1, T1-rho, T2, T2*, etc, based on acquisition and analysis of variably contrasted MR datasets. In cardiac MRI, native T1 mapping (also referred to as pre-contrast T1 mapping, or contrast-agent-free T1 mapping) techniques in particular have emerged as a novel approach for myocardial tissue characterisation with increasing utility in cardiac diagnostic imaging. They reflect signals from the intracellular and extracellular compartments, and offer quantitative, pixel-wise measures to detect changes in myocardial composition. T1 mapping enables the detection of pathologically important processes related to excess water, for instance in oedema and inflammation, protein deposition, and other T1-altering substances such as fat, iron and a range of commonly encountered cardiac conditions. T1 mapping provided standardised and quantitative representation of T1-weighted images, and has demonstrated to have narrow normal range and to differentiate a wide range of myocardial diseases. Its advantages include quantitative measurements, relatively simple single breath-hold acquisitions, excellent reproducibility, and avoidance of gadolinium-based contrast agents. Mapping techniques have shown sensitivity to disease beyond and earlier than LGE patterns can be observed (Ferreira et al. "Native T1-mapping detects the location, extent and patterns of acute myocarditis without the need for gadolinium contrast agents", J Cardiovasc Magn Reson 16, 36 (2014), Dass et al., "Myocardial Tissue Characterization Using Magnetic Resonance Noncontrast T1 Mapping in Hypertrophic and Dilated Cardiomyopathy", Cardiovascular Imaging. 2012; 5:726-733).

According to a first aspect of the present invention, there is provided a method of producing a computed contrast-enhanced medical image, the method comprising: receiving an image dataset of the subject comprising a native quantitative mapping image obtained by performing a contrast agent-free magnetic resonance imaging procedure; and inputting the image dataset to an image processor and processing the image dataset with the image processor to produce a computed contrast-enhanced medical image; wherein the image processor comprises a machine learning processor trained on a training dataset comprising sets of images, each set of images comprising a contrast agent-free native quantitative mapping image having the same quantitative mapping as the quantitative mapping image of the image dataset and a corresponding acquired contrast-enhanced medical image.

Thus, with the invention the need to administer contrast agent to the subject is obviated by training an image processor to predict what the computed contrast-enhanced medical image would be from contrast agent-free quantitative mapping image. It was previously thought that this was impossible, because of the pharmacokinetic aspects of contrast-enhanced imaging are different from those of native imaging. Here, the inventors have found that contrast-agent-free quantitative mapping provides same or better pathological sensitivity than CE medical images. As a result, by training a machine learning processor on sets of images, one of the set being a quantitative mapping image obtained from a subject without contrast agent and another of the set being a corresponding medical image obtained after administration of contrast agent, the trained machine learning processor can produce a computed CE medical image from the contrast-agent-free quantitative mapping image. The computed CE medical images have been assessed as having better image quality than the acquired CE medical images, and in some cases better in sensitivity to diseases, e.g., oedema, as discussed below.

The computed CE medical image provides standardised presentation of quantitative mapping images and a way to achieve different disease sensitivities by specifying training dataset and MR modalities.

The computed CE medical image is free from typical CE artefacts (e.g. LGE artefacts), and is more sensitive to pathological changes (including oedema and general expansion of intracellular matrix in diffuse pathologies) than CE (known to relate to focal fibrosis, and breakdown of brain-blood-barrier in brain). Therefore, the computed CE medical image showing appearance similar to CE (e.g. LGE), has better image quality and can detect a wider range of pathologies than the actual CE (e.g. LGE). This is believe to arise from simulataneously exploiting the information in native quantitative mapping while using machine learning to present them with a similar appearance to CE images. This is achieved without the need to administer to the subject a contrast agent and related lengthy scanning procedures.

The machine learning processor is trained to process the contrast agent-free quantitative mapping image and produce a computed CE medical image to match with the corresponding acquired contrast-enhanced medical image as a target or "ground-truth" to a predetermined degree, for example by minimising the differences (or reducing them below a predetermined threshold), which is geared to make the computed CE medical image indistinguishable from the corresponding actually acquired CE medical image by a simultaneously trained machine learning classifier. As the acquired CE medical image is used as the target or ground truth image in the machine learning, the computed CE medical image is effectively of the same type as the acquired CE medical image.

As is well-known machine learning processors use a data processing algorithm to produce target output data from input data, with the algorithm being refined in an iterative training process in which input data from a training dataset (for which the target data is known) is processed by the machine learning processor, the output is compared to the target data, and the algorithm is adjusted (through, e.g., backpropagation in deep learning), with this process being repeated until the output is sufficiently close to the target, whereupon the machine learning processor is regarded as trained and can be used to process new input data.

The contrast-agent-free quantitative mapping image may be a T1 mapping image, including for example a T1-rho mapping or a stress T1 mapping. The contrast-agent-free quantitative mapping image may alternatively have a quantitative mapping image other than a T1 mapping, for example a T2 mapping, or a T2* mapping.

The image processor may also utilise information in additional one or multiple contrast-agent-free MR images. Thus the method may comprise obtaining magnetic resonance images of the subject from a plurality of different contrast-agent-free sequences, inputting to the image processor the plurality of images, and processing them to produce the enhanced (computed CE) image to standardize the appearance of the said mapping technique.

The corresponding acquired CE medical image (and so effectively also the computed CE medical image) may be a CE magnetic resonance image, such as an LGE image.

In one example, the corresponding acquired CE medical image may itself be a quantitative mapping image having the same or different quantitative mapping as the quantitative mapping image of the image dataset, which is useful for standardisation of the T1 mapping appearance for the immediate clinical diagnosis.

It is foreseeable to use in training synthetic LGE images (Abdula et al, "Synthetic late gadolinium enhancement cardiac magnetic resonance for diagnosing myocardial scar", Scandinavian Cardiovascular Journal, 52:3, 127-132) and segmented lesion masks (Ferreira et al. "Native T1-mapping detects the location, extent and patterns of acute myocarditis without the need for gadolinium contrast agents", J Cardiovasc Magn Reson 16, 36 (2014),), or combination of such derived images with a contrast enhanced images.

However, in an alternative embodiment corresponding acquired CE medical image, (and so effectively also the computed CE medical image) may be a computed contrast-enhanced image of a non-MR modality, for example a contrast-enhanced CT image such as a late iodinated-contrast enhancement CT image, a contrast-enhanced PET image, a contrast-enhanced SPECT image, or a contrast-enhanced ultrasound image, etc. In general, it may be any type of imaging that employs the administration of contrast agents or introducing physiological stress to produce additional enhancement, especially in any form already accepted as a standard in medical applications.

In one type of embodiment, the image dataset of the subject may comprises the native quantitative mapping image only. This may be useful in cases where the method is applied to standardise the quantitative mapping. In another type of embodiment, the image dataset of the subject may further comprise other images of the subject and/or further data that is not image data. Thus, the image processor may comprise one or multiple convolutional streams to take as input one or more image modalities, and/or streams to take as input MR metadata or non-image diagnostic information. There will now be explained some non-limitative examples which may be used in any combination.

The image dataset of the subject may further comprise at least one further magnetic resonance image obtained by a contrast agent-free magnetic resonance modality other than the quantitative mapping of the quantitative mapping image of the image dataset. In that case, the sets of images of the training dataset further comprise at least one further magnetic resonance image obtained by the other contrast agent-free magnetic resonance modality.

In some examples, the at least one further magnetic resonance image may comprise at least one of: a raw magnetic resonance image, an image that is a fusion of raw magnetic resonance images, or an image that is a derivation of raw magnetic resonance images.

In some examples, the at least one further magnetic resonance image may comprise at least one of: a T1 mapping image, a T1-weighted image (including a T1 inversion-recovery weighted image), a T2-weighted image, a T2*-weighted image, a T2 mapping image, a T2* mapping image, or a cine CMR image.

In some examples, the at least one further magnetic resonance image comprises at least one of: a STIR image, a tagged-CMR image, a strain-encoded image, a diffusion-weighted image, a diffusion tensor image, an arterial spin labelling image, a PD weighted image, or a fat-water separated image.

The image dataset of the subject may further comprise at least one contrast agent-free non-MR image. In this case, the sets of images of the training dataset further comprise at least one non-magnetic resonance image of the same type as the at least one non-magnetic resonance image of the image dataset.

In some examples, the at least one non-magnetic resonance image may comprise at least one of: an echocardiogram, a nuclear perfusion image, a CT image, an electrophysiological cardiac map image, or a chest X-ray.

The at least one non-magnetic resonance image may be at native baselines, stress or pharmacologically induced conditions.

The method may further comprise the step of inputting to the image processor at least one acquired CE medical image already available from previous visit or study of the same subject.

A CE medical image may be substituted by the derived segmented masks, based on CE medical images or other clinically viable human segmentation of images. Such a processed mask may be derived from such images for a clinically meaningful parameter (such as indicating pathological levels of oedema, fibrosis, infarction, microvascular obstruction, or similar).

The image dataset may comprise further data that is not image data. Typically, the further data may be data related to the subject and/or data relating to the input images.

In some examples, the further data may comprise least one of: imaging metadata, such as image acquisition parameters, or at least one non-imaging diagnostic test result.

The imaging metadata may comprise at least one of the MR apparatus manufacturer model name or designation, magnetic field strength, software version, inversion time, etc.

The non-imaging diagnostic test result may comprise at least one of: a MR spectroscopy result, a blood test result, an electrocardiogram, the subject's clinical characteristics (e.g. medical conditions, medications, symptoms, the subject's risk factors, the subject's history, physical examination findings), or the subject's reason for referral.

The image processor comprises a trained machine learning algorithm, process or processor which may be for example one of: a trained Generative Adversarial Network (GAN), a trained conditional GAN, a trained Fully Convolutional Neural Network, a trained variational autoencoder, a trained U-Net, a trained V-Net. The image processor may have multiple input streams to match with the number of input modalities, and/or non-convolutional streams to take as input the non-image information.

The computed CE medical image provides standardised presentation of quantitative mapping images and a way to achieve different disease sensitivities by specifying training dataset and CMR modalities.

The technique is data driven and inherits information from the contrast-agent-free mapping which means that the machine learning processor may be trained on a training dataset of plural corresponding acquired CE medical images with different characteristics (e.g. with oedema and without myocardial oedema, myocarditis, acute myocardial infarction, and/or chronic myocardial infarction). In that case, the image dataset may be processed with the image processor to produce plural computed contrast-enhanced medical images, so that the computed contrast-enhanced medical images have different sensitivities (e.g., detecting chronic MI scar only, or detecting chronic MI scar and oedema).

Optionally, such plural computed contrast-enhanced medical images may be combined to produce a combined contrast-enhanced medical image for further enhancement to produce a new comprehensive computed CE medical image that can differentiate between disease conditions (e.g., chronic MI scar and oedema). The combined contrast-enhanced medical image can differentiate disease conditions better than a single computed CE medical image or a single traditional CE medical image.

As an alternative to combining only computed CE medical images, it is possible to combine but may also comprise both computed CE medical images and acquired CE medical images to produce the combined computed CE image.

In accordance with the first aspect of the invention, the machine learning processor has been trained as described above. Optionally, the step of training the machine learning processor may be a part of the method.

In accordance with the first aspect of the invention, the image dataset of the subject is received and input to the image processor. Optionally, the step of obtaining the image dataset of the subject may be a part of the method, for example performing a contrast agent-free magnetic resonance imaging procedure on a subject to obtain the image dataset comprising the native quantitative mapping image, and when other images are used also performing other imaging procedures to obtain those other images.

According to a second aspect of the present invention, there is provided an image processor adapted to produce a computed contrast-enhanced medical image, the image processor comprising: an input for receiving an image dataset of a subject comprising a quantitative mapping image obtained by performing a contrast agent-free magnetic resonance imaging procedure; a data processor for processing the input image dataset to produce a computed contrast-enhanced medical image; wherein the data processor comprises a machine learning processor trained on a training dataset comprising sets of images, each set of images comprising a contrast agent-free native quantitative mapping image having the same quantitative mapping as the quantitative mapping image of the image dataset and a corresponding acquired contrast-enhanced medical image.

The image processor of the second aspect of the present invention performs a method equivalent to the first aspect of the present invention, and so the various features described above may equally be applied to the second aspect of the present invention.

According to a third aspect of the invention provides a method of training a data processor as above, the method comprising the steps of: a) receiving a training dataset comprising corresponding sets of images comprising a contrast agent-free native quantitative mapping image of a subject, a corresponding acquired contrast-enhanced image of the subject, and optionally at least one further image of the subject and/or further data that is not an image; b) inputting to the data processor the contrast agent-free native quantitative mapping image, of each set, and, if present, the at least one further image of the subject and/or the further data of each set, processing it with the data processor using a generative image processing function to produce a computed contrast-enhanced medical image, and comparing the computed contrast-enhanced medical image to the corresponding acquired contrast-enhanced image from the set; c) altering the processing performed by the data processor to reduce the differences between the computed contrast-enhanced medical image and the corresponding acquired contrast-enhanced image from the set; and d) repeating steps b) and c) until the differences between the computed contrast-enhanced medical images and the corresponding acquired contrast-enhanced images are below a predetermined threshold.

The method of the third aspect of the present invention may be used to train the image processor in the first and second aspects of the present invention, and so the various features described above may equally be applied to the third aspect of the present invention.

Preferably the method further comprises operating an adversarial discriminator to distinguish between computed contrast-enhanced medical images produced by the generative image processing function and the corresponding acquired contrast-enhanced images by classifying each image as either a computed contrast-enhanced image produced by the generative image processing function or a contrast-enhanced image, wherein the processing performed by the generative image processor is altered in step c) to reduce a cost function including both the differences between the computed contrast-enhanced medical images and the corresponding acquired contrast-enhanced images, and the classification confidence. The adversarial discriminator is simultaneously trained to increase its classification accuracy by reducing a separate loss function of classification, e.g., cross-entropy loss.

According to further aspects of the present invention, there are provided a computer program capable of execution by a computer apparatus and configured, on execution, to cause the computer apparatus to perform a method according to the first aspect of the invention, a computer-readable storage medium storing such a computer program, and a computer apparatus arranged to perform a similar method.

The invention may also provide a magnetic resonance scanner system or scanner operating system which is adapted to perform or control the contrast agent-free MR imaging procedure and to process the resulting MR image to provide an enhanced medical image in-line on the scanner in accordance with the method of the invention. Thus the invention comprises a scanner which can provide a computed CE medical image as one of the available output options for the operator.

The invention will be further described by way of examples with reference to the accompanying drawings in which:

FIG. 1(A) schematically illustrates an apparatus for processing images of a single MR native (i.e., contrast-agent-free) T1 map in accordance with one embodiment of the invention;

FIG. 1(B) schematically illustrates an apparatus for processing MR native T1 map images supplemented by additional MR sequences in accordance with a second embodiment of the invention;

FIG. 2(A) schematically illustrates a process for training an apparatus for processing MR native T1 map images in accordance with an embodiment of the invention;

FIG. 2(B) illustrates a training dataset provided to the training process shown in FIG. 2(A)

FIGS. 3(A) and (B) schematically illustrates a step of training a generator and a discriminator in an apparatus for processing MR native T1 map images in accordance with another embodiment of the invention;

FIGS. 4(A) and (B) schematically illustrate an example step of training a generator and a discriminator in an apparatus for processing MR native T1 map images in accordance with another embodiment of the invention;

FIG. 5 schematically illustrates an example of a generator architecture used in the apparatus of the embodiment of FIG. 4;

FIG. 6 illustrates an alternative generator architecture utilising four streams of input information;

FIG. 7 schematically illustrates a discriminator architecture used in the embodiment of FIG. 4;

FIG. 9 illustrates for combining multiple c-CE images each produced by a differently trained image processor unit to produce a combined c-CE image that can differentiate various type of disease conditions;

Figure 10B:
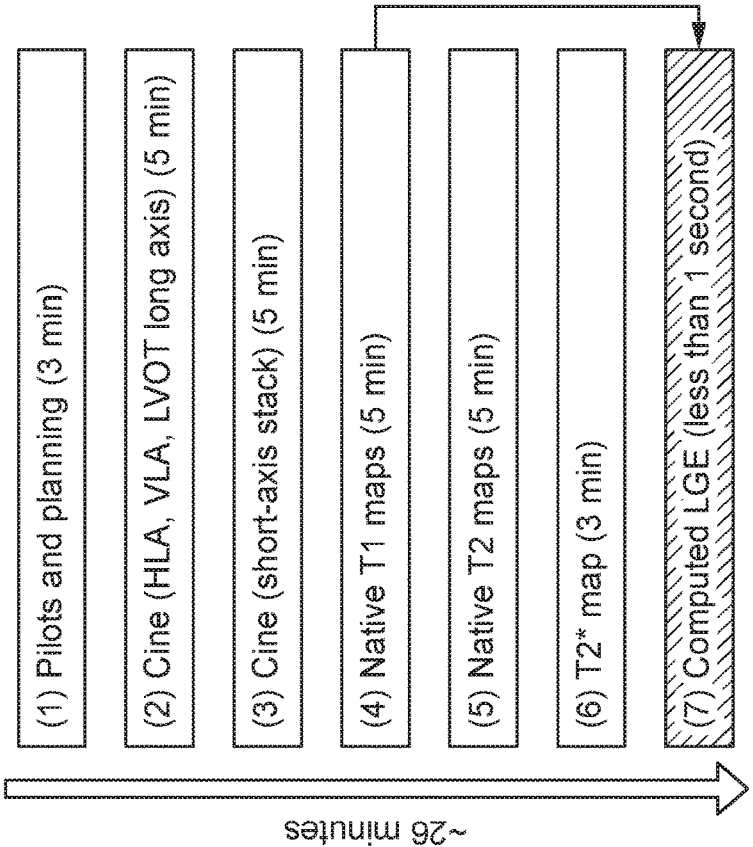
Figure 10A:
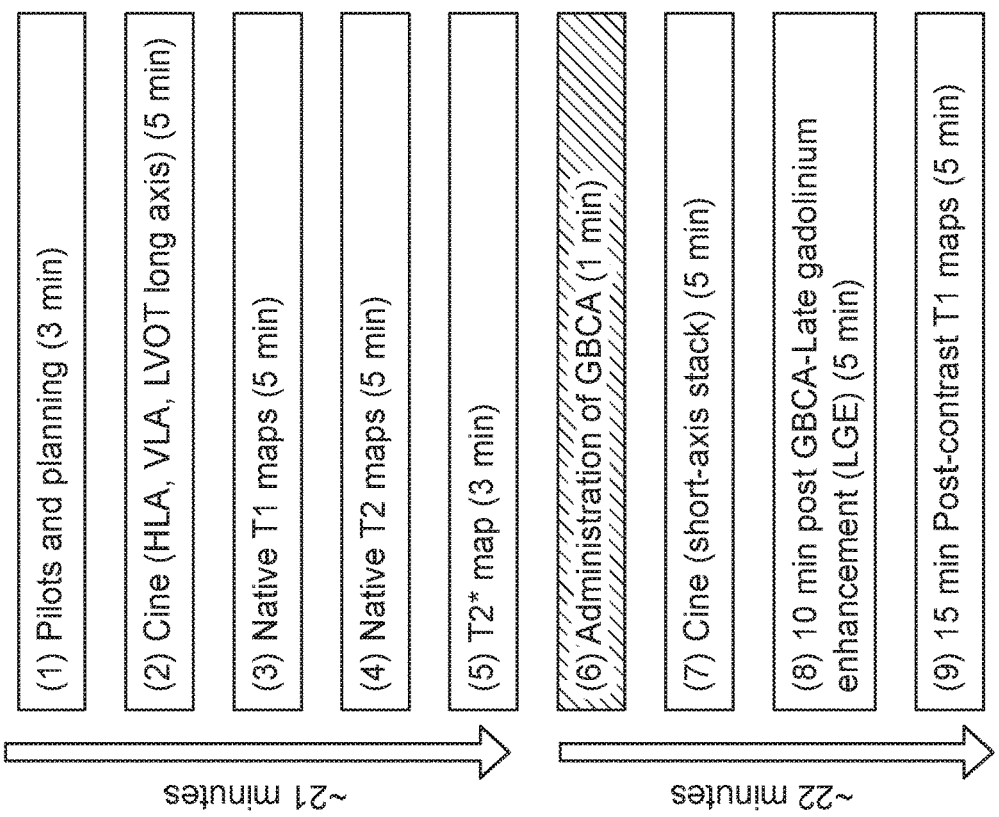
Figure 11:
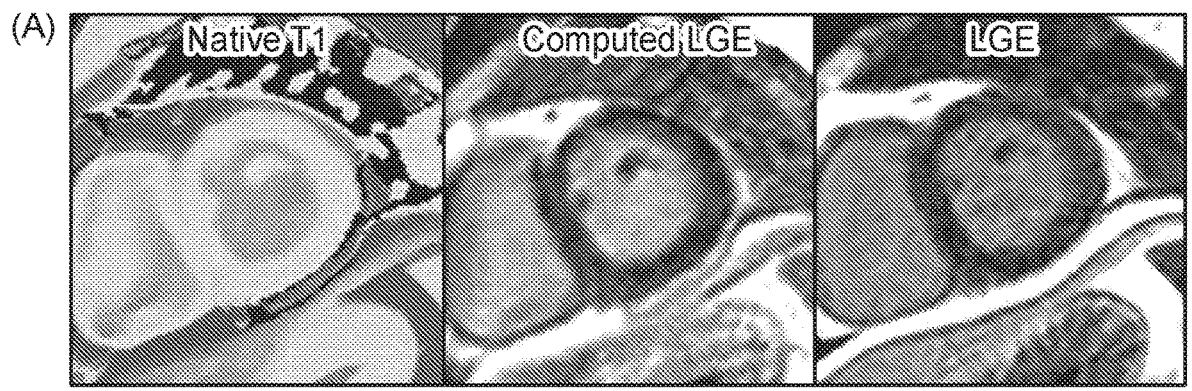
Figure 12:
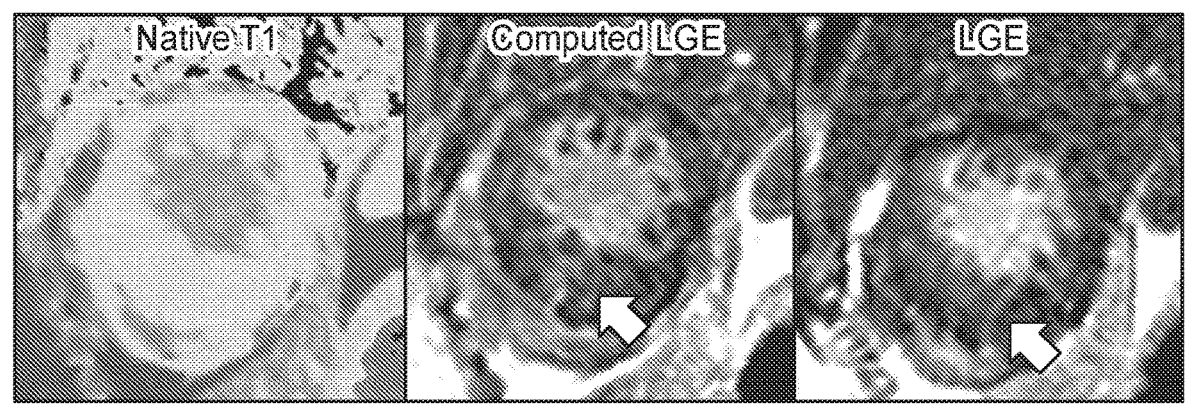
Figure 13:
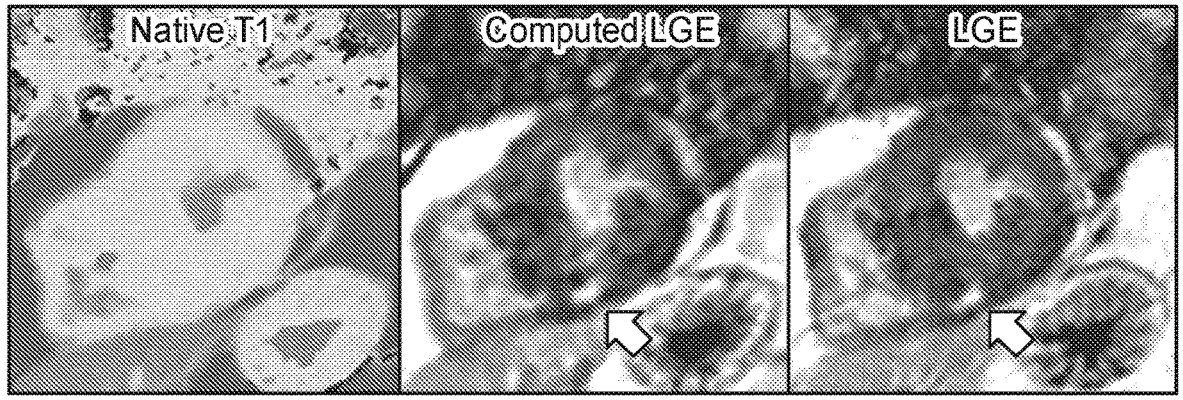
Figure 14:
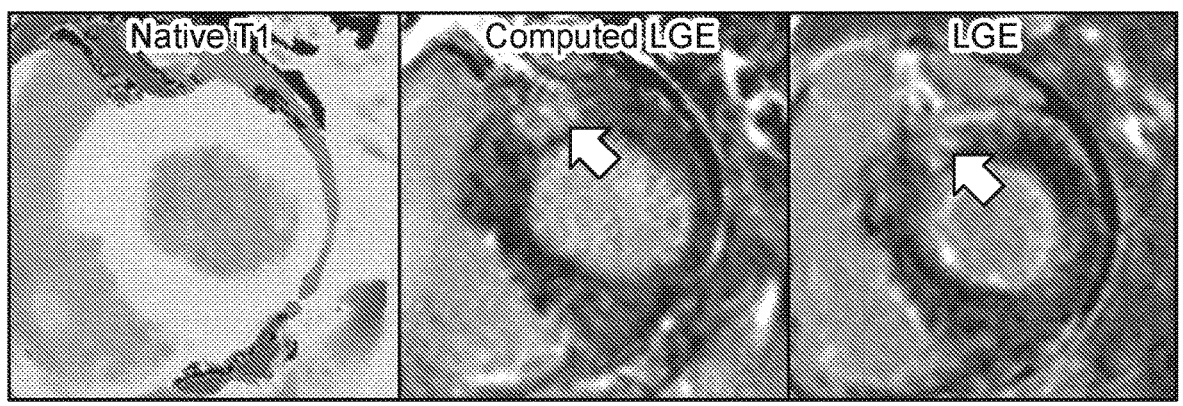
Figure 15:
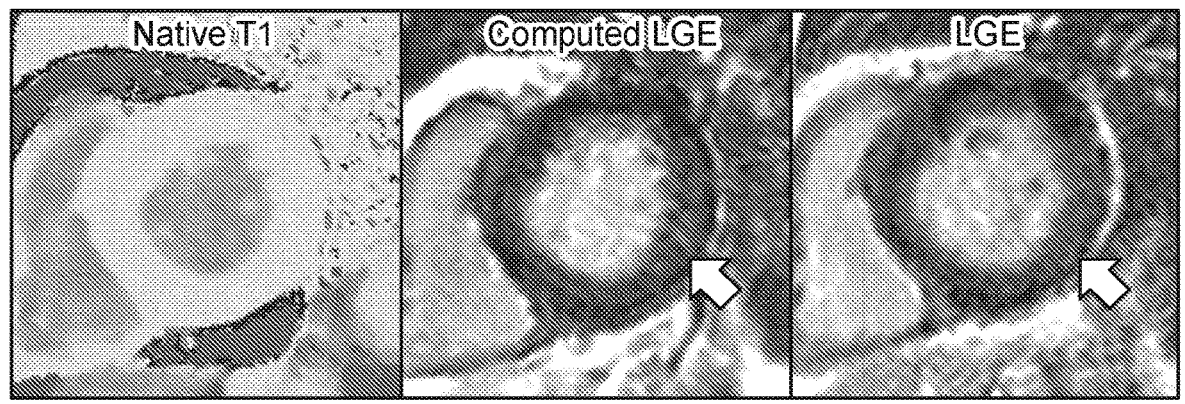
Figure 18:
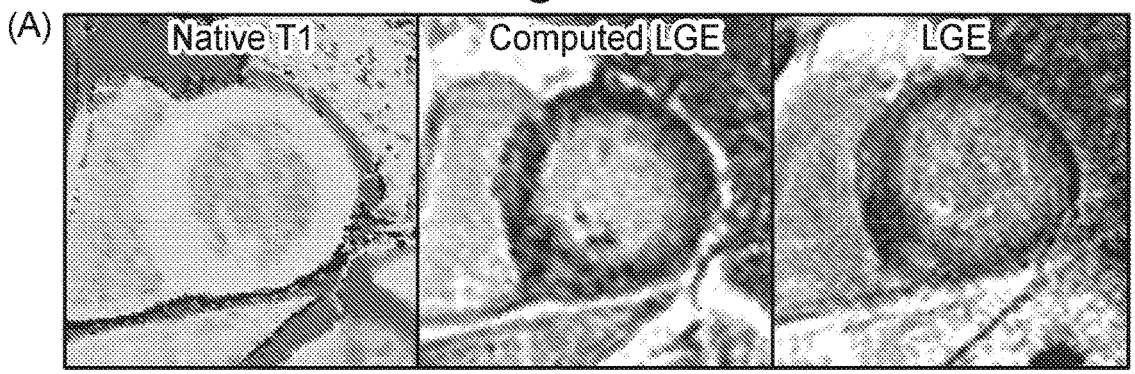
Figure 20:
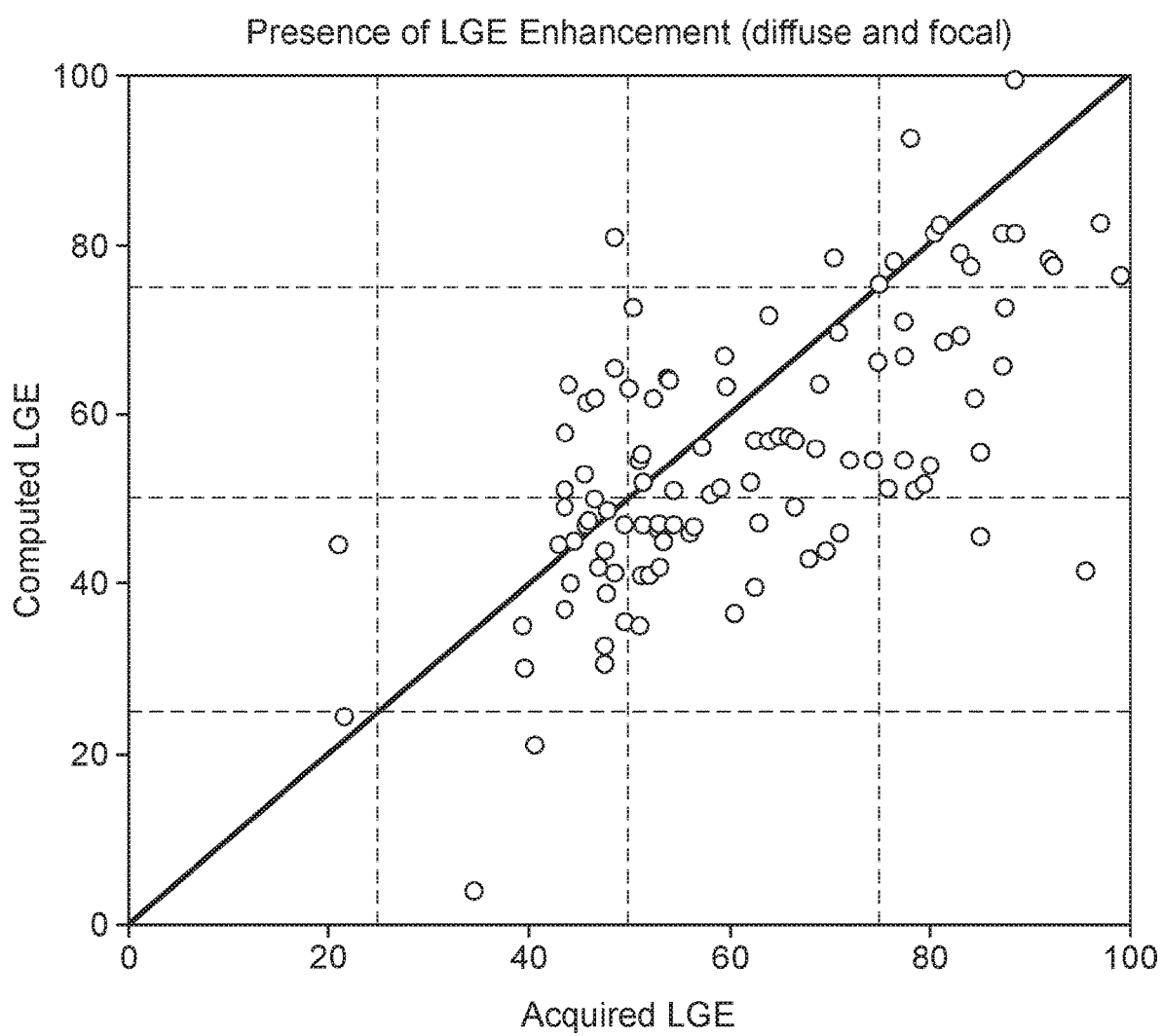
Figure 21:
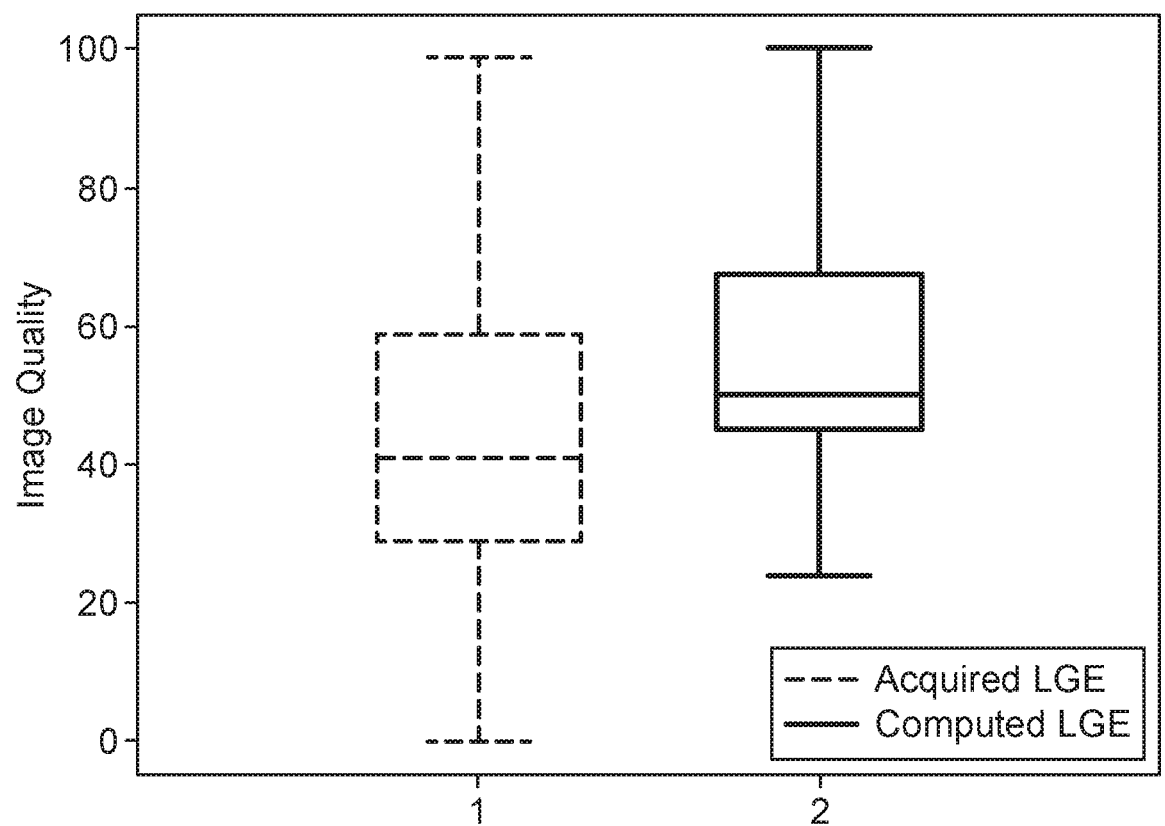
Figure 22:
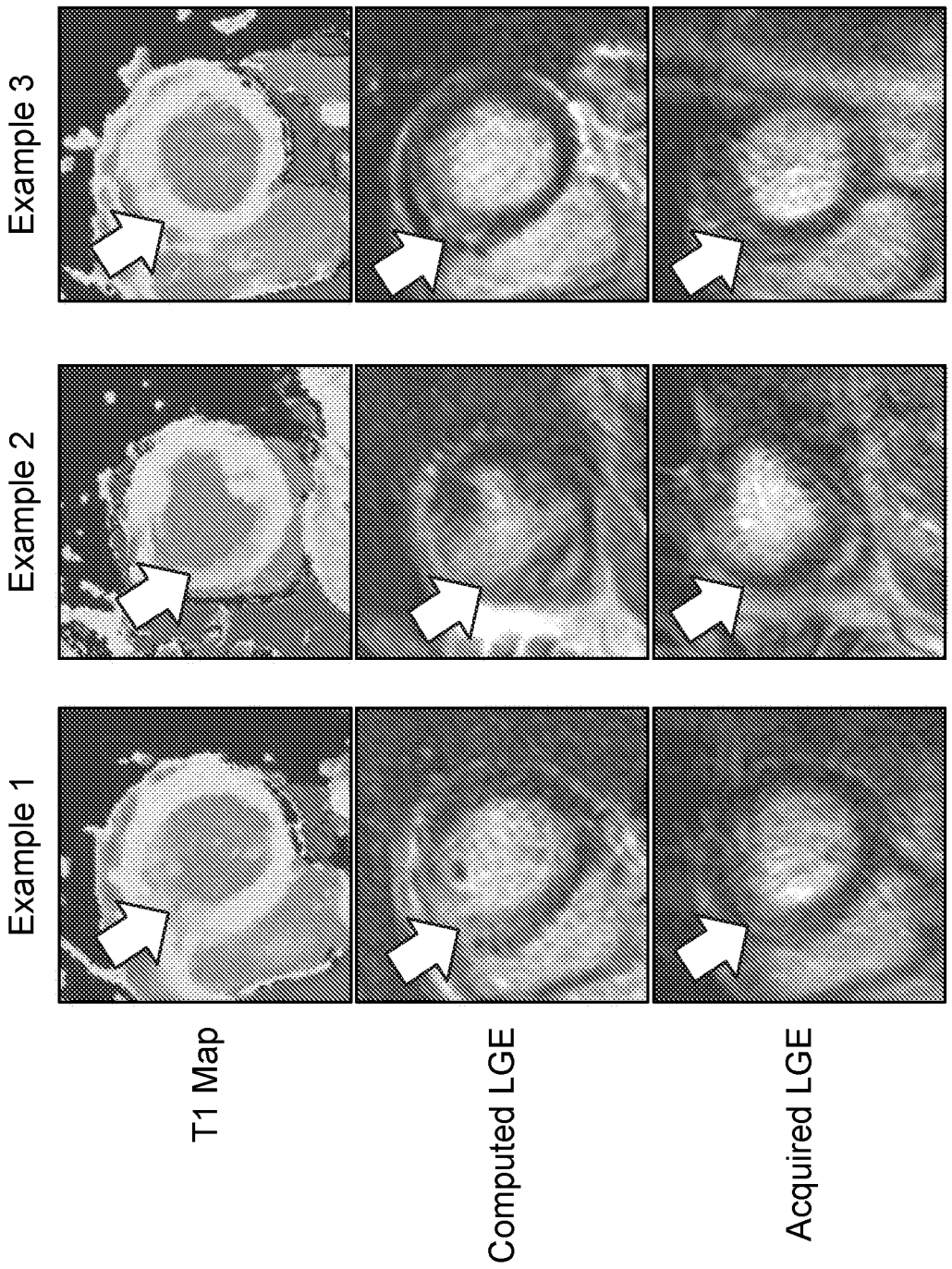
Figure 23:
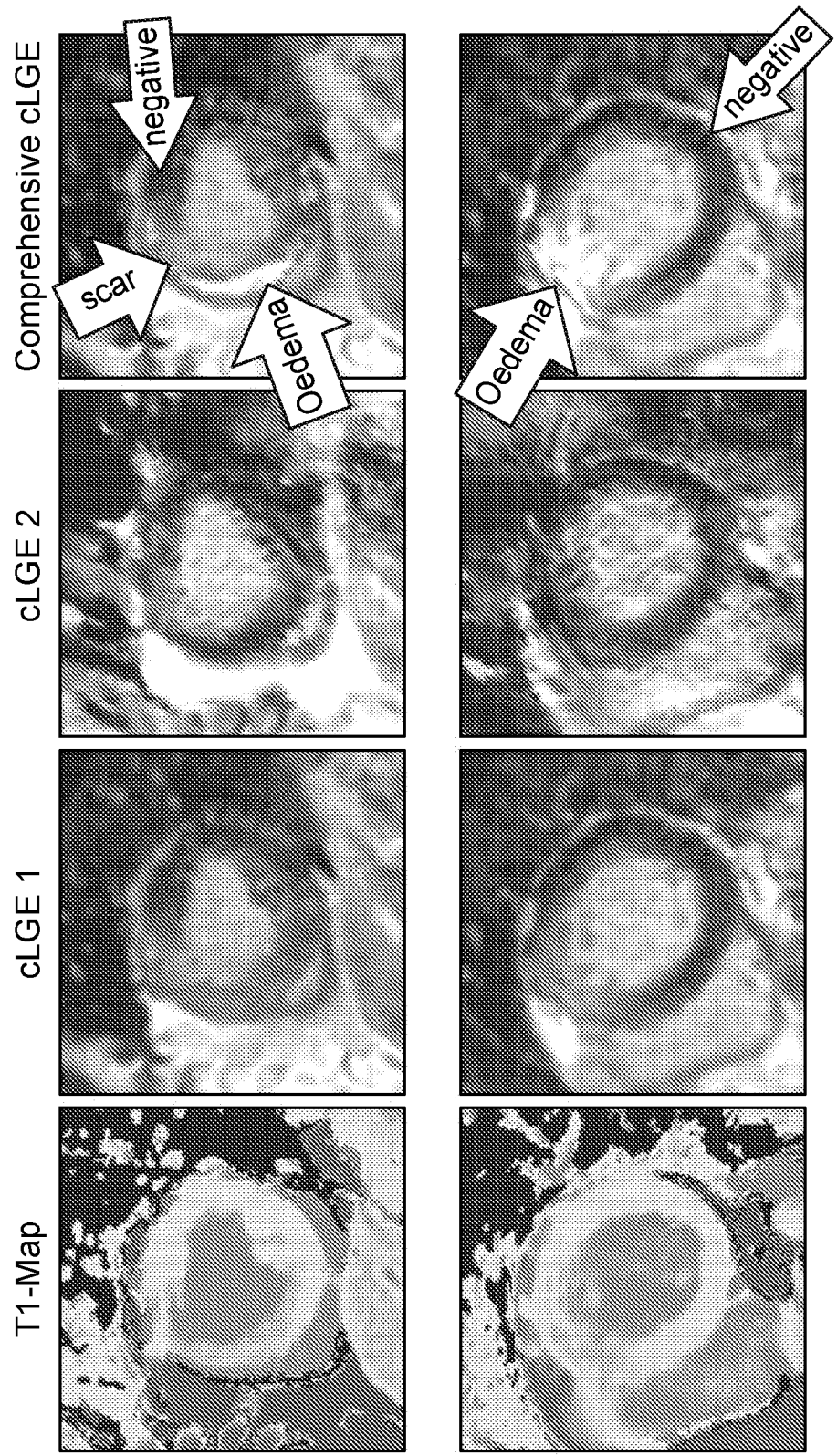

FIGS. 10(A) and (B) illustrate schematically MRI procedures respectively according to the prior art and to an embodiment of the invention;

FIGS. 11(A) and (B) illustrate for comparison native T1, computed LGE and LGE scans obtained in accordance with an embodiment of the invention;

FIG. 12 illustrates for comparison native T1, computed LGE and LGE scans obtained in accordance with an embodiment of the invention;

FIG. 13 illustrates for comparison native T1, computed LGE and LGE scans obtained in accordance with an embodiment of the invention;

FIG. 14 illustrates for comparison native T1, computed LGE and LGE scans obtained in accordance with an embodiment of the invention;

FIG. 15 illustrates for comparison native T1, computed LGE and LGE scans obtained in accordance with an embodiment of the invention;

FIGS. 16(A) and (B) illustrate for comparison native T1, computed LGE and LGE scans obtained in accordance with an embodiment of the invention;

FIG. 17 illustrates for comparison native T1, computed LGE and LGE scans obtained in accordance with an embodiment of the invention;

FIGS. 18(A) and (B) illustrate for comparison native T1, computed LGE and LGE scans obtained in accordance with an embodiment of the invention;

FIGS. 19(A) and (B) illustrate for comparison native T1, computed LGE and LGE scans obtained in accordance with an embodiment of the invention;

FIG. 20 is a graph showing the alignment between computed LGE and LGE in detecting presence of LGE enhancement;

FIG. 21 is a graph of image quality for a c-CE image and an acquired CE image;

FIG. 22 illustrates for comparison enhanced native T1, computed LGE and LGE scans obtained in accordance with an embodiment of the invention; and FIG. 23 illustrates a combined computed CE image that can differentiate normal tissue, myocardial oedema and myocardial infarction scar.

In this text, reference is made to magnetic resonance imaging or scan "procedures". A procedure is conducted according to a protocol, and may include one or several scan sequences in which each sequence produces differently weighted raw image(s) and their fusions and derivations such as quantitative maps, etc., and may include non-MR imaging steps, such as blood tests and contrast agent administration. The protocol may also set out aspects relevant to the subject such as rest times, and breath-hold requirements.

FIG. 1 schematically illustrates an apparatus that implements a method for processing a contrast agent-free magnetic resonance T1 mapping image to produce a computed contrast-enhanced medical image in accordance with a first embodiment of the invention.

The apparatus 1 comprises an input 3 which receives an image dataset 100 which in this example comprises only a T1 mapping image 101 (also referred to as a "T1 map image" or "T1 map", that has been previously obtained by performing a contrast agent-free magnetic resonance imaging procedure, for example a MOLLI or ShMOLLI T1 mapping image in gray scale or colour map, which can be any number of raw input T1-weighted images and phase maps with any associated metadata (e.g. inversion times) obtained using the experiment for T1 mapping. T1 data may be replaced by T2 data or any other MR image dataset adequate to predict the target type of CE image.

In these examples, the T1 mapping image 101 (and also the T1 mapping image 21 used in training and described below) is an example of an image having a quantitative mapping. Any T1 mapping may be used, including a T1-rho mapping or a stress T1 mapping. More generally, the T1 mapping image 101 (and also the T1 mapping image 21 used in training and described below) may be replaced by an image having any other quantitative mapping, for example being a T2 mapping image or a T2* mapping image. Such quantitative mapping is provided by acquisition and analysis of variably contrasted MR datasets. The resultant image provides quantitative mapping of the specific underlying magnetic properties of the substances in the image, such as T1, T1-rho, T2, T2*, etc.

The MR image dataset 100 is passed to an image processor 5 which is a data processor which uses a trained machine-learning (or artificial intelligence) process. The image processor 5 processes the input image dataset 100 to produce a computed contrast-enhanced image 6 which has similar appearance and pathological sensitivity as an acquired contrast-enhanced image that would have been obtained had the subject been scanned after administration of a contrast agent. Herein, this is termed a computed CE medical image (c-CE image) 6. The c-CE image may be displayed on a display 7 or otherwise output.

In the embodiment of FIG. 1(A) the image processor 5 is trained on a training dataset comprising sets of images, each set of images comprising a contrast agent-free T1 mapping image having the same quantitative mapping as the T1 mapping image 101 of the image dataset 100 and a corresponding acquired contrast-enhanced medical image.

The contrast agent-free T1 mapping image of the training dataset is obtained by performing the same contrast agent-free magnetic resonance imaging procedure as the T1 mapping image 101 of the image dataset 100, for example a MOLLI or ShMOLLI acquisition.

The corresponding acquired contrast-enhanced medical image of the training dataset is the target or "ground truth" image for the machine learning. Thus, the computed c-CE image 6 is effectively of the same type as the acquired CE medical image.

FIG. 1(B) illustrates a second embodiments of the invention in which the apparatus 1 is the same that of FIG. 1(A), except that the image dataset 100 is expanded to include further data, in addition to the T1 mapping image 101.

The further data of the image dataset 100 may include at least one further magnetic resonance image 102. The further magnetic resonance images 102 are obtained by a contrast agent-free magnetic resonance modality other than the quantitative mapping acquisition of the T1 mapping image 101. Some examples are T2* weighted images, cine MR images, STIR, tagged-CMR, strain images, diffusion images, PD weighted images, DTI, ASL, etc. Other examples are given above. The further magnetic resonance images 102 may be obtained by a single contrast agent-free magnetic resonance modality or by plural different contrast agent-free magnetic resonance modalities.

The image dataset 100 is received at the input 3 and passed to an image processor 5 which operates as described above to produce a c-CE medical image 6 that is displayed on display 7 or otherwise output. In this case, image processor 5 has been trained on an training dataset as described above, except that the sets of images of the training dataset further comprise at least one further magnetic resonance image obtained by the other contrast agent-free magnetic resonance modality, corresponding to that of the further magnetic resonance images 102 of the image dataset 100.

The further data of the image dataset 100 may include at least one non-magnetic resonance image 103. The non-magnetic resonance images 103 are obtained by a contrast agent-free non-magnetic resonance modality. Some examples are given above. The non-magnetic resonance images 103 may be obtained by a single modality or by plural different modalities.

The image dataset 100 is received at the input 3 and passed to an image processor 5 which operates as described above to produce a c-CE medical image that is displayed on display 7 or otherwise output. In this case, image processor 5 has been trained on an training dataset as described above, except that the sets of images of the training dataset further comprise at least one non-magnetic resonance image obtained by the contrast agent-free non-magnetic resonance modality, corresponding to that of the non-magnetic resonance images 103 of the image dataset 100. The further data of the image dataset 100 may include further data 104 that is not image data. The further data 104 may be data related to the subject and/or data relating to the input images. The further data 104 may be imaging metadata, such as image acquisition parameters, or at least one non-imaging diagnostic test result for the subject such as blood test results, electrocardiograms, clinical characteristics (e.g. medical conditions, medications, symptoms, risk factors, history, physical examination findings), reasons for referral of the subject for imaging, and other imaging diagnostic tests (echocardiogram, nuclear perfusion imaging, CT scans, electrophysiology cardiac mapping, chest x-rays, etc.). Other examples are given above Although three different types of further data are illustrated, namely further magnetic resonance images 102, non-magnetic resonance images 103 and further data 104. However, it is not essential to use all these types of further data and more generally any one or any combination of the different types of further data may be used. In that case, the training dataset includes a corresponding combination of data.

The image dataset 100 is received at the input 3 and passed to an image processor 5 which operates as described above to produce a c-CE medical image that is displayed on display 7 or otherwise output. In this case, image processor 5 has been trained on an training dataset as described above, except that the training dataset further comprises further data, corresponding to that of the further data 104 of the image dataset 100.

The alternative types of further data described with reference to FIG. 1(B) may be used together, in any combination. That is, at least one further magnetic resonance image 102, at least one non-magnetic resonance image 103 and further data 104 may be used in any combination, and the training data set includes a corresponding combination of data.

Thus, the image processor 5 is a trained machine learning process which is trained on a training dataset whose content corresponds to the streams of data of the image data set 100 input to the apparatus 1, along with the corresponding acquired contrast-enhanced medical images obtained by use of contrast agent.

The acquired CE medical images may be MR images. In this case, the acquired CE medical images may be MR images that are not quantitative mapping images. Alternatively, the acquired CE medical images may be MR images that are quantitative mapping images, optionally having the same quantitative mapping as the T1 map images 101 of the image dataset 100, or having a different quantitative mapping. In this case, they are obtained by performing a contrast-enhanced magnetic resonance imaging procedure.

Alternatively, the acquired contrast-enhanced medical images of the training dataset may be contrast-enhanced medical image of a non-magnetic resonance modality, for example contrast-enhanced CT images, PET images, or SPECT images, or ultrasound images based on administration of contrast agents (injection, ingestion, inhalation, etc.), or obtained with introducing physiological stress to produce additional enhancement dependent on pathophysiological tissue properties. In this case, they are obtained by performing a contrast-enhanced procedure of the relevant non-magnetic resonance modality.

Examples of suitable machine learning algorithms that may be employed in the image processor 5 are: fully convolutional neural networks, variational autoencoder, U-nets, dense U-net, V-nets, generative adversarial networks (GANs), including its variants such as conditional GAN, Cycle GAN, cascaded refinement networks.

The image processor 5 may be trained prior to the performance of the methods performed by the apparatus 1 shown in FIG. 1(A) or 1(B) to provide the trained machine learning processor.

Figure 2A:
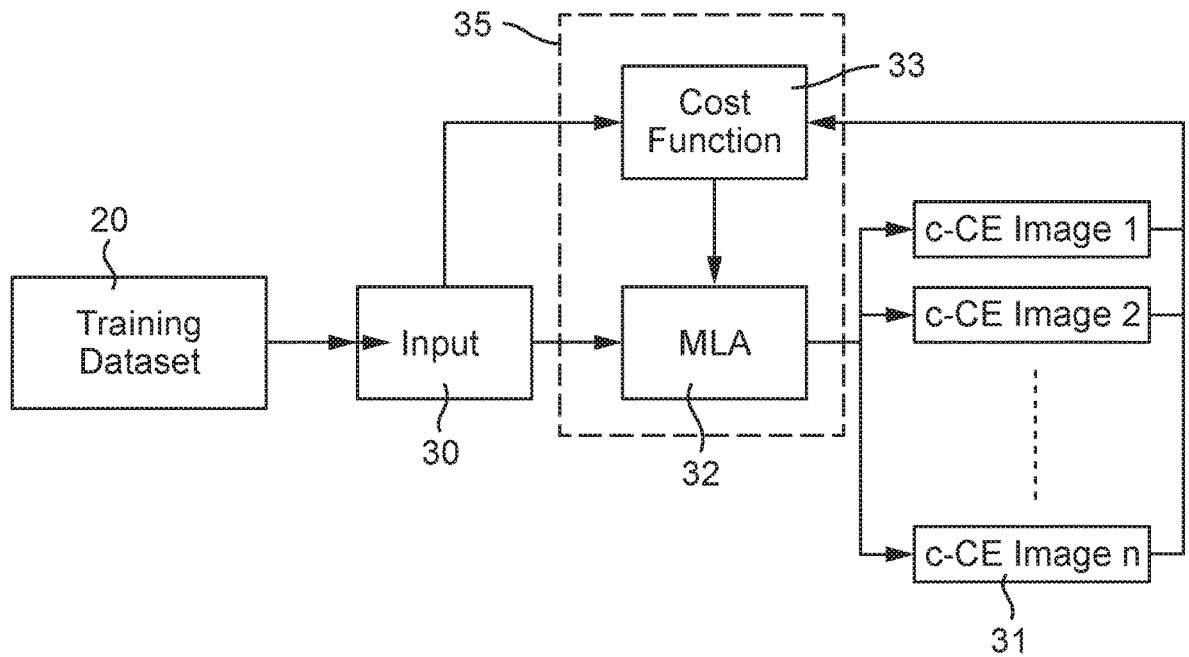

FIG. 2(A) illustrates how the image processor 5 is trained. Specifically, FIG. 2(A) shows the functional blocks that perform the training method, as follows.

Figure 2B:
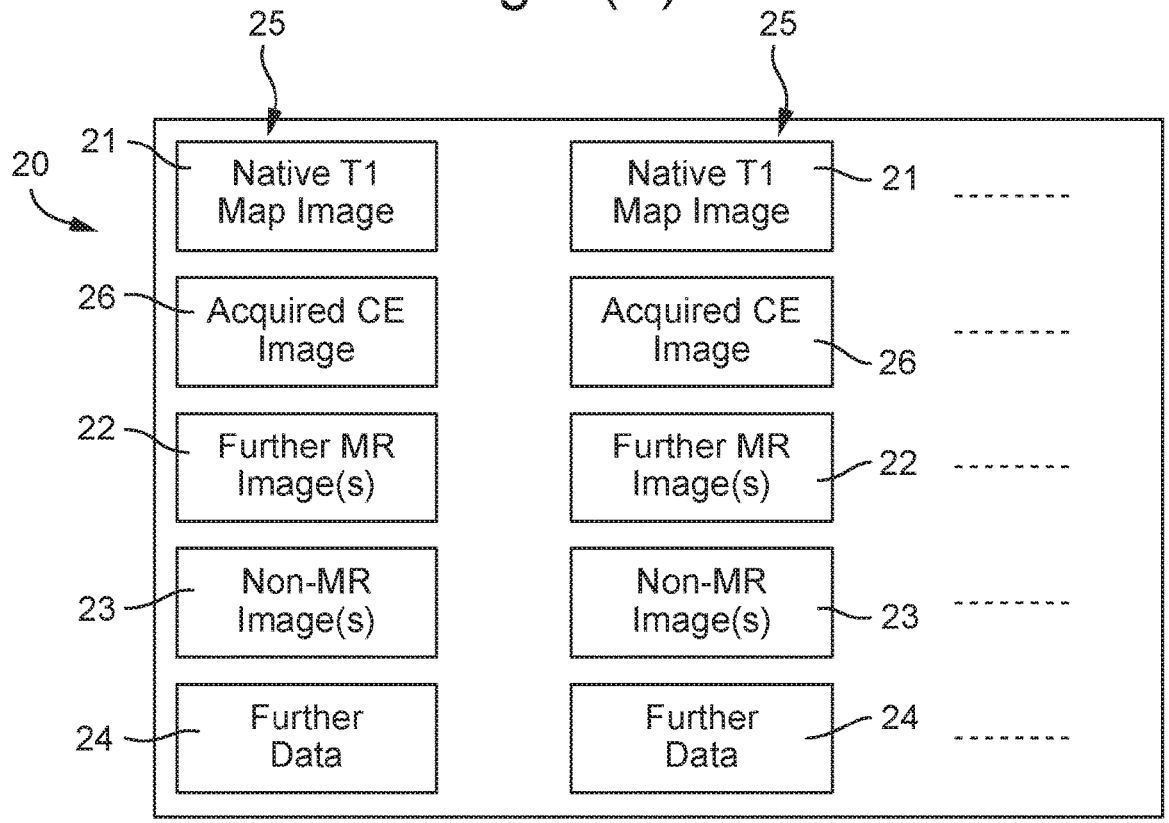

FIG. 2(B) illustrates a training dataset 20 used in the training. The training data set 20 comprises sets of images 25, each set of image 25 comprising the following data.

As mentioned above, each set of images of the training dataset 20 comprises a contrast agent-free T1 mapping image 21 having the same quantitative mapping as the T1 mapping image 101 of the image dataset 100 and an acquired contrast-enhanced medical image 26. The contrast agent-free mapping image 21 and contrast-enhanced medical image 26 in each set correspond to each other in that they are obtained from the same subject or patient, for example being images obtained before contrast agent is administered to the patient and after administration of the contrast agent to the patient.

The acquired CE medical image and the contrast agent-free T1 mapping image of the respective sets of images 25 of the training dataset 20 may be obtained in the same MR scan procedure with the images acquired in the same position relative to the subject so that the images contain matching pathology configurations. However, they may alternatively be obtained from different procedures at different times. They may, for example, be obtained using different scanners (where one procedure requires a different protocol or scanner configuration from another for example). As mentioned above, although the acquired CE medical image may be a T1 mapping image, it may alternatively be an MR image that is of a different modality from a T1 mapping (including but not restricted to a quantitative mapping image), or may be a contrast-enhanced medical image produced by a non-magnetic resonance modality. They can be from different procedures of: the same or different imaging techniques; the same or different patient position, e.g., combining short-axis and long-axis CMR images to predict short-axis LGE, with the image position and orientation information provided; and/or the same or different times, e.g., procedures from previous visits of the same patient.

In general, the sets of images 25 of the training dataset 20 (and in the circumstance of using the trained processor, the input data) are data registered with the same patient.

Plural sets of images 25 are used. In principle, any number of sets of images 25 may be used, although the training is improved by increasing the number of sets of images 25 and variation in the sets of images 25. Preferably the training set comprises pairs of images 25 pairs from many different patients with different clinical conditions and a suitable training set may be obtained from, for example, the Hypertrophic Cardiomyopathy Registry which has over 4000 suitable pairs of quality-controlled pre-contrast CMR and corresponding LGE (Late Gadolinium Enhancement) images.

In the case of using the apparatus of FIG. 1(A), the sets of images 25 of the training dataset 20 comprise only a T1 mapping image 21 and an acquired contrast-enhanced medical image 26, and not the further data described below. In this case, the "set" of images 25 is a pair of images. However, training dataset 20 may comprise further data as follows.

In the case of using the apparatus of FIG. 1(B), the further data is used as follows.

Where the image dataset 100 includes at least one further MR image 102, the sets of images 25 of the training dataset 20 additionally comprise at least one further magnetic resonance image 22 obtained by the other contrast agent-free magnetic resonance modality, corresponding to that of the further magnetic resonance images 102 of the image dataset 100.

Where the image dataset 100 includes at least one non-MR image 103, the sets of images 25 of the training dataset 20 additionally comprise at least one non-magnetic resonance image 23 obtained by the contrast agent-free non-magnetic resonance modality, corresponding to that of the non-magnetic resonance images 103 of the image dataset 100.

Where the image dataset 100 includes further data 104, the sets of images 25 of the training dataset 20 additionally comprise further data 24, corresponding to that of the further data 104 of the image dataset 100.

The training is performed using techniques which are known in the art of machine learning, as follows. The training dataset 20 is received at input 30 into the training processor 35 which includes a machine learning algorithm 32 which processes contrast agent-free T1 mapping image 21 of each set of images 25 (and if used also: the at least one further magnetic resonance image 22; the at least one non-magnetic resonance image 23 and/or the further data 24) to produce a computed CE image 31 of the same patient.

The computed CE images 31 are compared to the corresponding actual CE images 26 in the training dataset 20 and a cost function calculator 33 calculates a measure of their difference. The machine learning algorithm 32 is then repeatedly modified to reduce the difference between the computed CE images 31 and the actual CE images 26 through e.g., backpropagation. The data of the training dataset 20 may be augmented by rotation, translation, reflections, scaling, distortions, adding noise etc., to improve the robustness of the learning process.

Once the computed CE images 31 are judged as sufficiently close to the actual CE images 26, the machine learning algorithm 32 is regarded as trained and it can then be used to process new contrast agent-free MR images in an apparatus 1 to produce computed CE medical images 6.

FIGS. 3(A) and 3(B) illustrate the training process for a particular example of the machine learning algorithm 32, namely a conditional generative adversarial network (conditional GAN). Conditional GANs are described in, for example Phillip Isola et al., "Image-to-Image translation with Conditional Adversarial Networks", Berkeley AI Research (BAIR) Laboratory, UC Berkeley, and Ting-Chun Wang et al., "High-Resolution Image Synthesis and Semantic Manipulation with Conditional GANs", NVIDIA Corporation, CVPR 2018, the teachings of which may be applied here).

In this case, the machine learning algorithm 32 comprises the following functional blocks that perform the training method. Specifically, the machine learning algorithm 32 comprises a generator 51 and a discriminator 52. FIG. 3(A) illustrates the training step of generator 51. The generator 51 is trained to process the contrast agent-free T1 mapping image 21 of each set of images 25 (and if used also: the at least one further magnetic resonance image 22; the at least one non-magnetic resonance image 23 and/or the further data 24) to produce computed CE images 31 that: a) have minimal pixel-wise difference with the acquired CE images 26 and b) are indistinguishable from the acquired CE images 26 for the discriminator 52.

FIG. 3(B) illustrates the training step of the discriminator 52 using back-propagation of the classification loss value 55. The discriminator 52 is trained to discriminate between the acquired CE medical images 26 from the training dataset 20 and the computed CE medical images 31 produced by the generator 51. The discriminator 52 is not supplied with information saying which computed CE image 31 corresponds to which acquired CE image 26, and is only being trained to distinguish between the two types of image and to give an indication of how confident it is of that distinction.

A difference block 53 derives the difference between the computed CE images 31 and the acquired CE images 26 which is fed to a generator loss function block 54, together with a classification loss value 55 of the discriminator 52. The generator loss function block 54 trains the generator 51 by using back-propagation of the generation loss to repeatedly modify its processing to minimise the difference between the computed CE medical images 31 and the corresponding acquired CE medical images 26, and to increase the classification loss value 55 of the discriminator 52.

Once the computed CE medical images 31 are close enough to the actual CE images in the training dataset, the generator 51 may be used to process new contrast agent-free MR images in an embodiment of the apparatus as illustrated in FIG. 1. The discriminator 52 does not need to be used in the image processor 5 of FIG. 1.

Figure 4A:
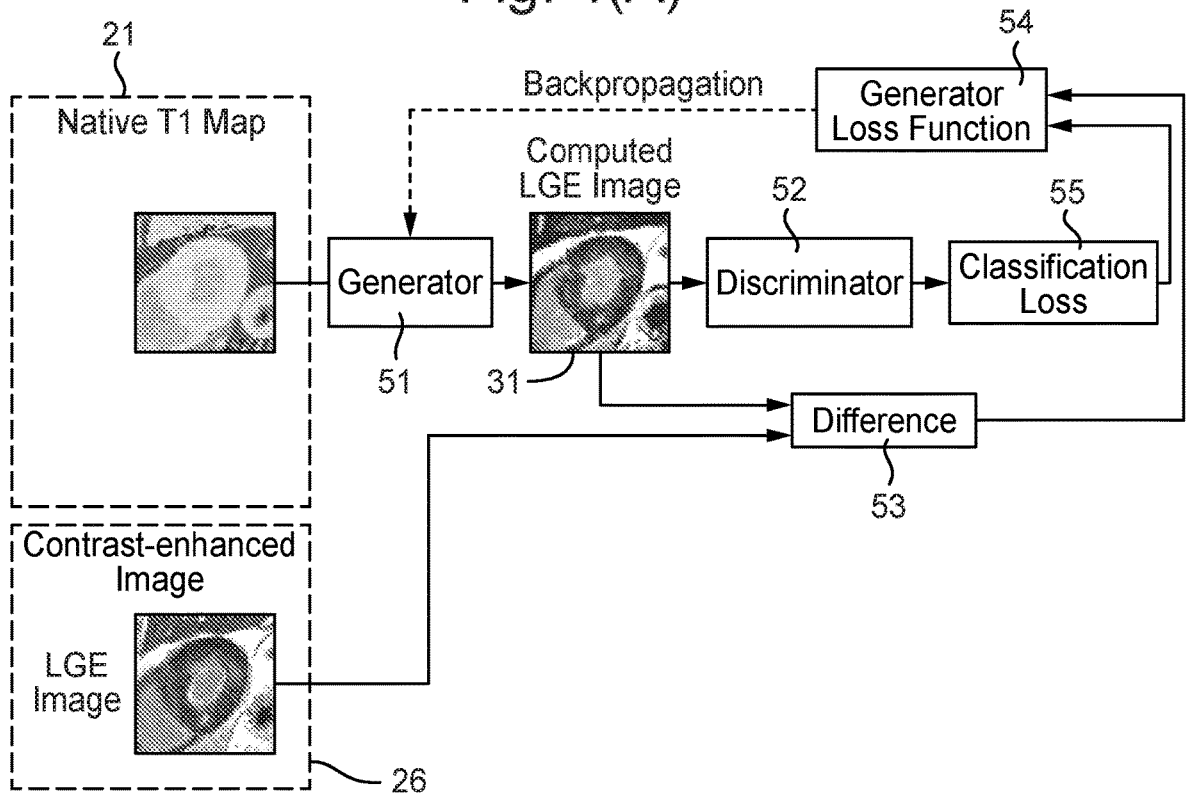

FIG. 4(A) illustrates a specific example of training of a machine learning image processor using a conditional GAN method a T1 mapping image 21 and an acquired contrast-enhanced medical image 26, being an LGE MR image in this example, as the ground truth for training. The T1 mapping image 21 can be in grey-scale or in colour map. T1 colour maps are T1 mapping images in which the T1 values are mapped to colours in the image according to a predetermined mapping, such as explained in US-2013/0322713.

As explained above with reference to FIG. 3, the generator 51 generates computed CE images 31, in this case computed LGE images, which are compared with actually acquired CE images 26, in this case LGE images, from the training dataset 20 so that the generator 51 can be trained to minimise the L1 distance loss between corresponding pairs of computed CE medical images 31 and acquired CE medical images 26, the computed CE images 31 also being provided to the discriminator 52 so that the generator 51 can be trained to maximise the classification loss value 55 as judged by the discriminator 52.

Figure 4B:
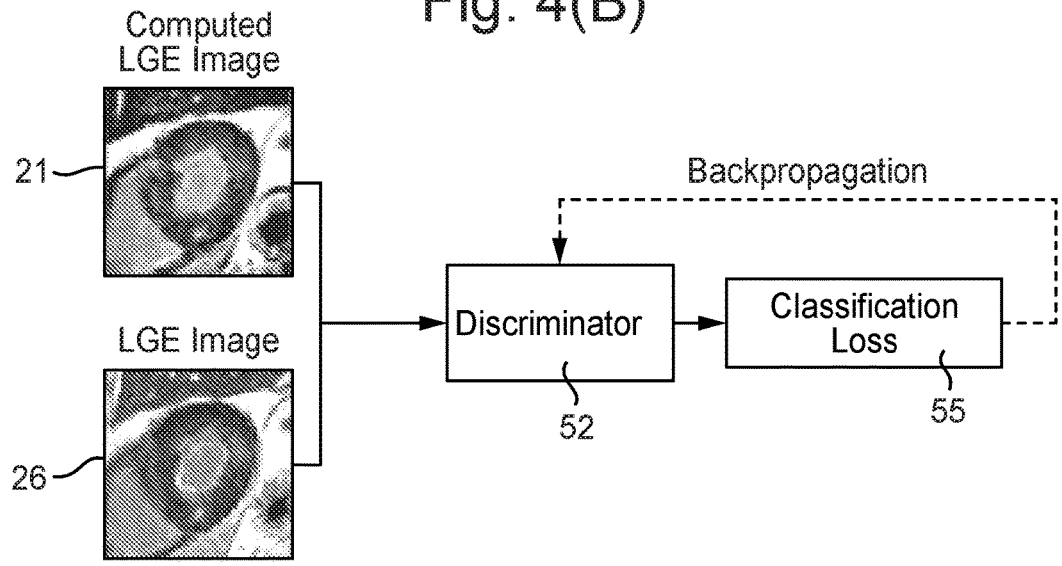

FIG. 4(B) illustrates a specific example of simultaneously training the machine learning discriminator 52 to identify computed CE images 31 and acquired CE images 26 by minimising the classification loss value 55.

Figure 5:
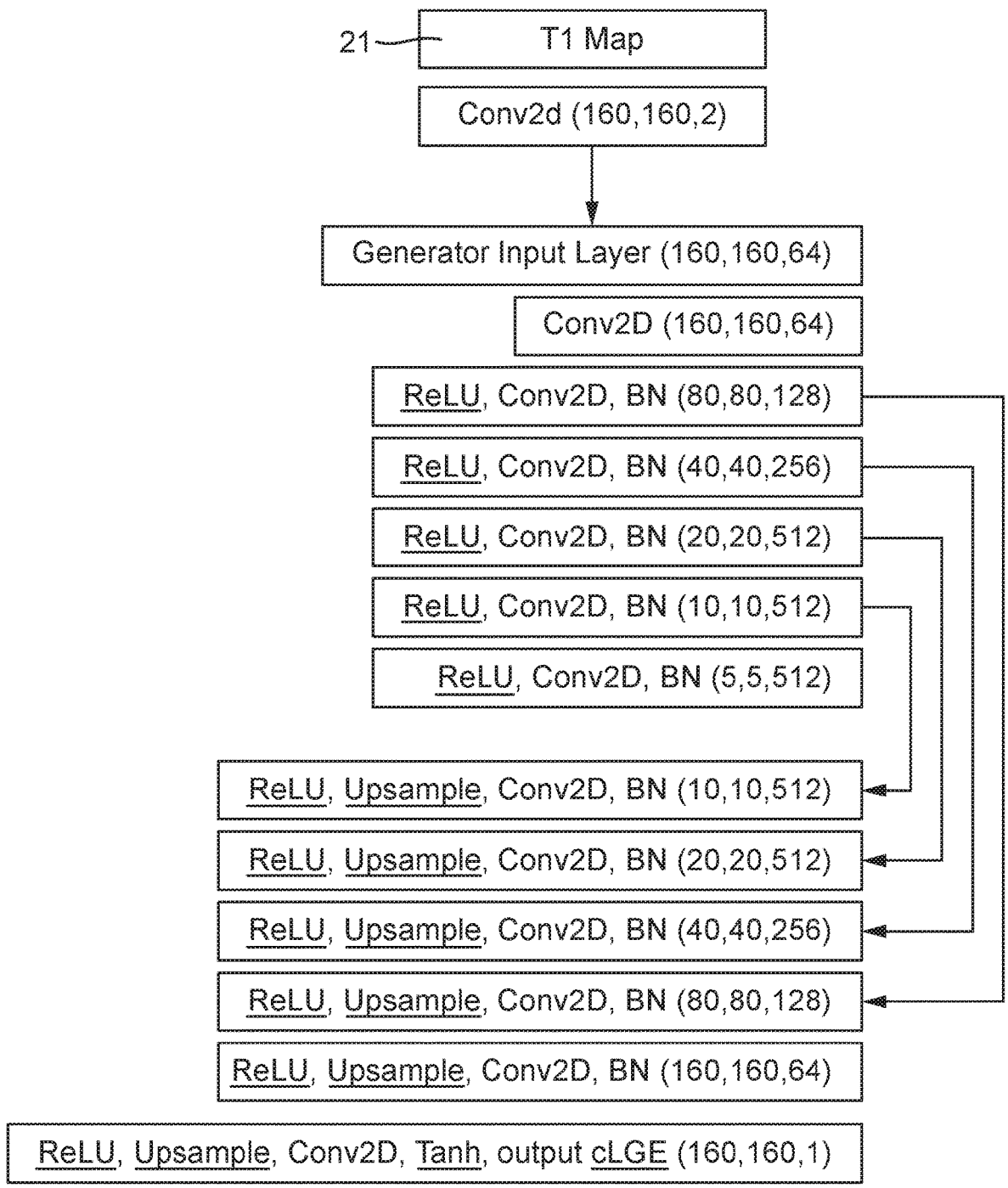

FIG. 5 illustrates one example of a generator architecture used for generator 51 which is a standard U-net structure with to which the input from the training set 20 is the T1 mapping image 21, which is processed by convolutional neural network layers and concatenated as inputs for the U-net.

Figure 6:
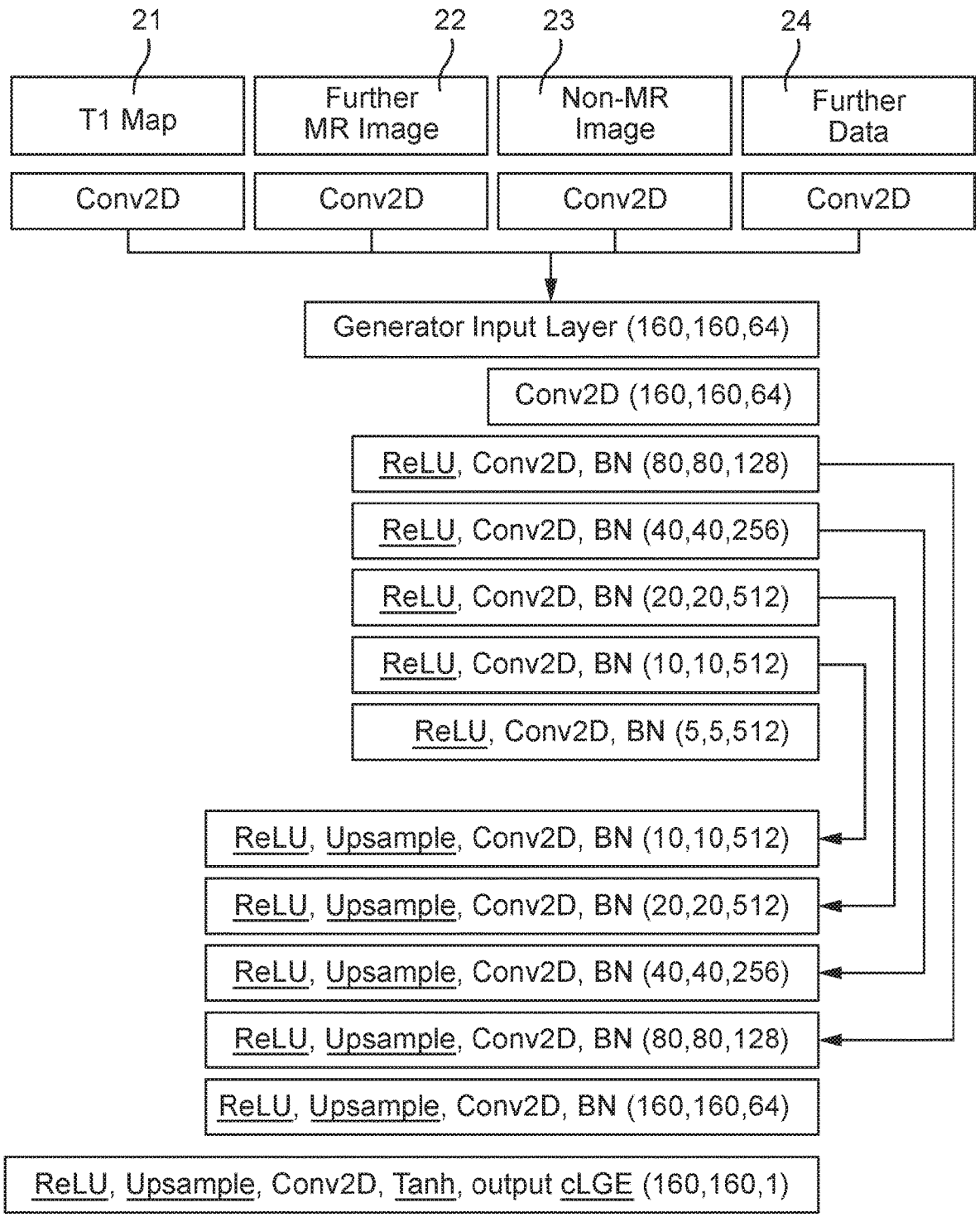

FIG. 6 illustrates a modified architecture for the generator 51 to which the input from the training dataset 20 is the T1 mapping image 21 and also: the at least one further magnetic resonance image 22; the at least one non-magnetic resonance image 23 and the further data 24.

Figure 7:
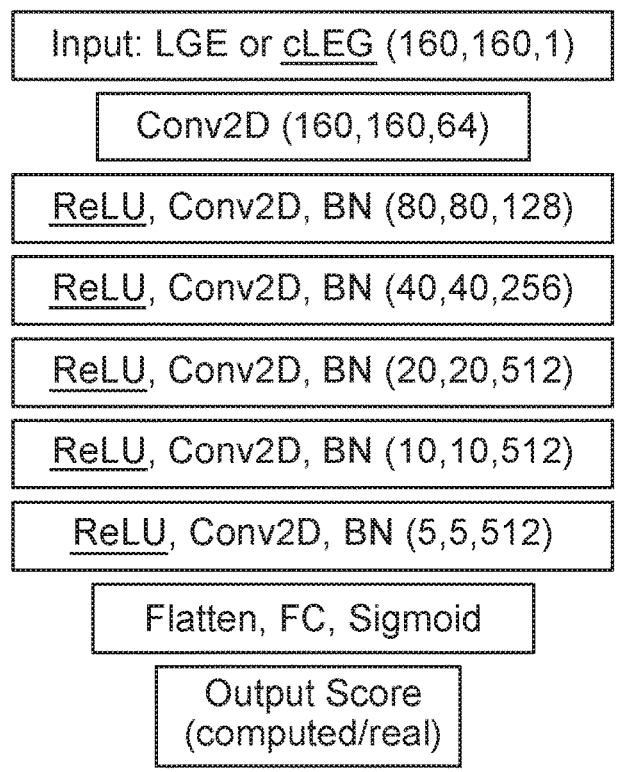

FIG. 7 illustrates a discriminator architecture used for the discriminator 52 in the embodiment of FIG. 4. The computed CE medical images 31 and acquired CE medical images 26 are processed by convolutional layers and fully connected layers to produce a label distinguishing real or computed CE images with confidence score.

Figure 8:
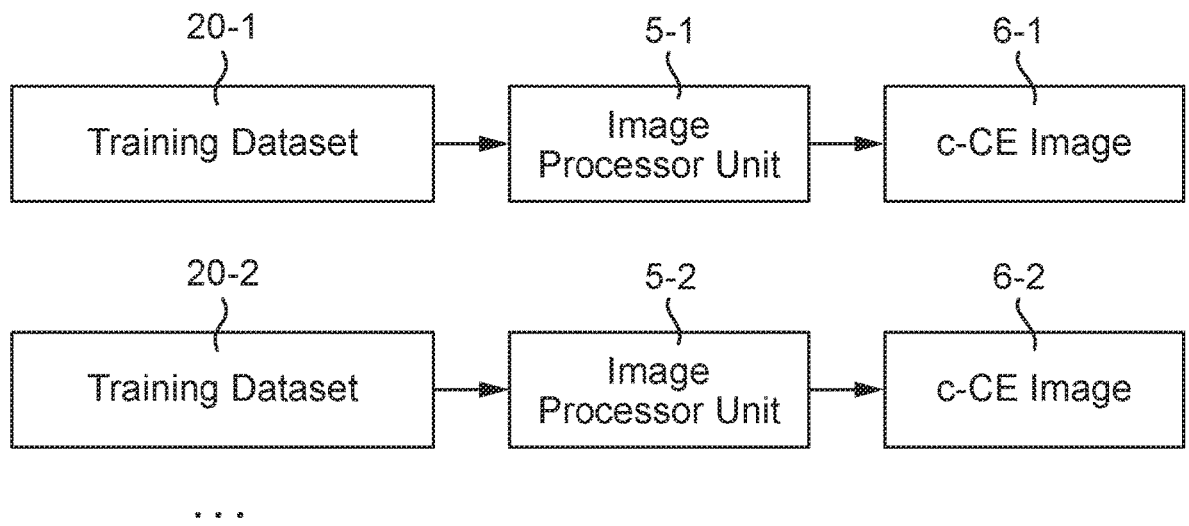
FIG. 8 illustrates for training multiple image processor units on different datasets to achieve sensitivity to different disease conditions.

FIG. 8 illustrates for training the image processor 5 with different training dataset to achieve sensitivity to different disease conditions. In this example, the image processor 5 includes plural units 5-1, 5-2, etc that are trained on respective training datasets 20-1, 20-2, etc with different characteristics such as different sensitivity to different disease conditions (e.g. with oedema and without myocardial oedema, myocarditis, acute myocardial infarction, and/or chronic myocardial infarction). The plural units 5-1, 5-2, etc then process the image dataset 100 to produce c-CE images 6-1, 6-2, etc that similarly have different sensitivity to different diseases.

Such c-CE medical images 6-1, 6-2 etc. may be combined to produce a combined contrast-enhanced medical image for further enhancement. FIG. 9 illustrates a specific example of producing a combined c-CE image 6-C, which may be implemented in the image processor 5. As illustrated, the T1 mapping image 101 is processed by two units 5-1, 5-2 of the image processor 5 to produce two respective c-CE images 6-1, 6-2. FIG. 9 shows an example in which the first c-CE image 6-1 is sensitive to oedema and the second c-CE image 6-2 is not sensitive to oedema.

The c-CE images 6-1, 6-2 are supplied to an ROI generator 61 which generates the oedema region of interest (ROI) 62 as the myocardial region that has higher signal intensity in the first c-CE image 6-1 (sensitive to oedema) than in the second c-CE image 6-2 (not sensitive to oedema). The oedema ROI 61 is colour-encoded. The oedema ROI 61 and one or both of the c-CE images 6-1, 6-2 (the second c-CE images 6-2 being illustrated as an example in FIG. 9) are supplied to an image combination unit 63 which combines them to produce the combined c-CE image 6-C. As shown in FIG. 9, combined c-CE image 6-C detects and differentiates normal myocardium (dark), oedema (pink), myocardial infarction scar (white) in a single computed LGE image (c-LGE image), which conventional LGE images are not able to achieve.

Thus, transforming quantitative T1 mapping into LGE-like image provides standardised presentation and allows direct combination of multiple modalities and trained c-LGE images 6-1, 6-2 etc. to further derive a comprehensive combined c-LGE image 6-C. The combined cLGE 6-C requiring no contrast agent administration can differentiate more disease conditions than conventional CE images requiring contrast agent administration. By way of example, FIG. 23 illustrates two examples of a T1 mapping image 101, a c-LGE image 6-1 that is sensitive to oedema, a c-LGE image 6-2 that is not sensitive to oedema and a combined c-LGE image 6-C that detects and differentiates normal myocardium (black), oedema region of interest (pink), and myocardial infarction scar (white), as pointed by arrows in FIG. 23.

FIGS. 10(A) and (B) illustrate respectively a general example of a (prior art) cardiac magnetic resonance (CMR) tissue characterisation protocol imaging procedure and a non-invasive contrast agent-free procedure in accordance with an embodiment of the invention.

As illustrated in FIG. 10(A) the prior art imaging procedure may include a long series of different imaging sequences to generate various modality MR images. The illustrated procedure includes: (1) Pilots and planning (3 min), (2) Cine (HLA, VLA, LVOT long axis) (5 min), (3) Native T1 maps (5 min), (4) Native T2 maps (5 min), (5) T2* map (3 min), (6) Administration of GBCA (1 min), (7) Cine (short-axis stack) (5 min), (8) Post GBCA—Late gadolinium enhancement (LGE) (5 min) at 10 minutes after the administration of GBCA, (9) Post-contrast T1 maps (5 min) at 15 minutes after the administration. A procedure of this type may last, for example, 45 minutes or so and may be too long for some subjects or inappropriate for some patient groups (e.g. acute or unstable patients).

FIG. 10(B) illustrates the modified protocol in accordance with an embodiment of the invention. In essence the procedure can cease before the administration of contrast agent and the image processor of the invention utilises the native T1 mapping to produce a computed CE image, in this case a computed LGE image, which thus does not require to be physically acquired. This can reduce the length of the procedure to around 25 minutes.

An embodiment of the invention has been tested by applying it to the CE free MR T1 mapping images from steps 4 of procedures such as those shown in FIG. 10(B) and comparing the resulting computed CE images (in this case computed LGE) to the real CE images (in this case LGE) from step 7 of such procedures. This embodiment of the invention used as input native T1 mapping images and a generator as illustrated in FIG. 5 as the image processor, trained with a conditional GAN method as illustrated in FIG. 4.

FIGS. 11 to 19 illustrate for comparative purposes the native T1 mapping images, actual LGE images and computed LGE images obtained. In each of FIGS. 11 to 19 the left hand image is the T1 image which is a colour map in the original image (although the colours are not visible in the black-and-white versions of the drawings), the middle image is the computed LGE image produced by the embodiment of the invention and the right hand image is the actual LGE image from the subject after administration of contrast agent.

FIGS. 11(A) and (B) illustrate that the computed LGE image is closely-similar to the LGE image for a variety of pathologies in individuals with no significant LGE, indicating viable (alive) myocardium.

FIG. 12 illustrates comparative images for an individual with diffused fibrosis in hypertrophic cardiomyopathy as indicated by fuzzy LGE (arrowed).

FIG. 13 illustrates focal LGE in the inferior insertion point between the right and left ventricles (arrowed).

FIG. 14 illustrates large areas of patchy LGE in the basal anterior wall (arrowed) and FIG. 15 illustrates diffused fibrosis in the basal inferolateral wall (arrowed).

Figure 19:
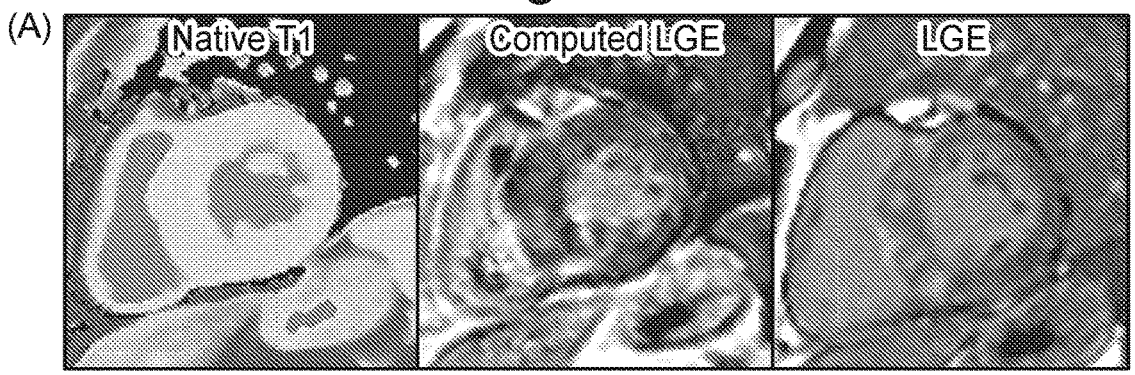

In contrast-enhanced imaging LGE images are acquired with inversion recovery (IR) or phase-sensitive IR (PSIR) techniques to reveal abnormal myocardial enhancement. A proper inversion time (TI) must be select to 'null' normal myocardial tissue, rending it dark in LGE images. If the scan operators make a mistake by selecting an incorrect TI, the LGE images will have poor quality or impaired diagnostic value. The optimal TI changes as GBCA washes out of the tissue, which means also poorer reproducibility of LGE images. FIG. 19 (A) and (B) illustrate cases in which the real LGE images were acquired with sub-optimal TI and incorrect nulling of myocardial tissue. Computed CE in comparison has no mechanism to be sensitive to the operator selecting the correct TI, the images appear all with properly nulled (dark) myocardium.

Because the computed CE procedure is much shorter than an actual CE scanning procedure the technique is potentially more robust to artefacts caused by, for example, patient fatigue or intolerance staying inside the scanner.

FIG. 17 illustrates comparative images in which the LGE image was obtained at the end of a 45-minute scan procedure. Many patients become tired by the end of the scan and could no longer hold their breath steadily causing breathing artefacts (arrowed) on the LGE image. Native T1 mapping images on which the computed CE image is based are short in breath-hold times (less than 10 seconds per slice) and are performed at the beginning of a scan procedure. The entire left ventricle of the heart can be covered with eight to ten slices (i.e. within 5 minutes including instruction time and time in between slices to allow the patient to breathe), making it less likely that there will be motion artefacts or patient intolerance.

Other examples of computed CE images demonstrating better image quality and less noise than an actual CE image are illustrated in FIGS. 18(A) and (B).

FIG. 21 illustrates the average quality scores of computed LGE (virtual LGE) and real LGE images assessed by a human observer. This shows that computed LGE have significantly better image quality than the traditionally acquired LGE.

Contrast-agent-free MRI modalities such as T1 mapping carry rich information and have better sensitivity to certain pathologies than LGE image, for example diffuse changes and oedema.

FIGS. 16(A) and (B) illustrate cases in which the computed LGE image shows pathology in the hypertrophic (thickened) septum while the actual LGE image shows nothing (arrowed).

FIG. 20 illustrated that the computed LGE shows generally good agreement with acquired LGE in detecting the presence and calculating the percentage of LGE enhancement, subject to potentially diagnostically significant differences.

FIG. 22 illustrates cases in which the computed LGE images detect oedema. In comparison, the actual LGE shows nothing or detects smaller range of oedema. This shows that computed LGE shows better sensitivity in detecting oedema (highlighted by arrows).

FIG. 23 illustrates the computed LGE image generated by combining multiple computed LGE images using the method in FIG. 9 detects and differentiates multiple conditions, e.g., oedema, chronic myocardial infarction scar (highlighted by arrows). This shows that computed LGE image contains more information and is able to detect more disease conditions than traditionally acquired LGE image.

The examples above demonstrate the efficacy of the methods when applied to the example of T1 mapping applied to the native T1 mapping image 101. The benefits are understood to arise from the use of the quantitative mapping, so similar efficacy is anticipated for other variants of T1 mapping including for example a T1-rho mapping or a stress T1 mapping and indeed for other contrast-agent-free quantitative mappings other than T1 mapping, for example T2 mapping, or T2* mapping.

The apparatus 1 shown in FIGS. 1(A) and 1(B), which may also perform the combination described with reference to FIGS. 8 and 9, may be a computer apparatus that implements the steps of the method. Similarly also the functional blocks used for training and shown in FIGS. 2 to 4(A) may be a computer apparatus that implements the steps of the method. To achieve this, a computer program capable of execution by the computer apparatus may be provided. The computer program is configured so that, on execution, it causes the computer apparatus to perform the relevant steps of the method.

The computer apparatus, where used, may be any type of computer system but is typically of conventional construction. The computer program may be written in any suitable programming language. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

The MR image dataset 100 may be obtained as part of the method. The MR image dataset 100 is obtained by performing a contrast agent-free imaging magnetic resonance procedure to provide the T1 mapping image, and, where other images are used, by performing suitable contrast agent-free imaging procedures to provide the other images.

The invention claimed is:

1. A method of producing a computed contrast-enhanced medical image, the method comprising:
   receiving an image dataset of a subject comprising a native quantitative mapping image obtained by performing a contrast agent-free magnetic resonance imaging procedure; and
   inputting the image dataset to an image processor and processing the image dataset with the image processor to produce a computed contrast-enhanced medical image,
   wherein the image processor comprises a machine learning processor trained on a training dataset comprising sets of images, each set of images comprising a contrast agent-free quantitative mapping image having the same quantitative mapping as the quantitative mapping image of the image dataset and a corresponding acquired contrast-enhanced medical image, and
   wherein the image dataset of the subject further comprises at least one further magnetic resonance image obtained by a contrast agent-free magnetic resonance modality other than the quantitative mapping of the quantitative mapping image of the image dataset, and the sets of images of the training dataset further comprise at least one further magnetic resonance image obtained by the other contrast agent-free magnetic resonance modality.

2. A method according to claim 1, wherein the at least one further magnetic resonance image comprises at least one of: a raw magnetic resonance image, an image that is a fusion of raw magnetic resonance images, or an image that is a derivation of raw magnetic resonance images.

3. A method according to claim 1, wherein the at least one further magnetic resonance image comprises at least one of: a T1 mapping image, a T1-weighted image, a T2-weighted image, a T2*-weighted image, a T2 mapping image, a T2* mapping image, or a cine CMR image.

4. A method according to claim 1, wherein the at least one further magnetic resonance image comprises at least one of: a STIR image, a tagged-CMR image, a strain-encoded image, a diffusion-weighted image, a diffusion tensor image, an arterial spin labelling image, a PD weighted image, or a fat-water separated image.

5. A method of producing a computed contrast-enhanced medical image, the method comprising:

receiving an image dataset of a subject comprising a native quantitative mapping image obtained by performing a contrast agent-free magnetic resonance imaging procedure; and inputting the image dataset to an image processor and processing the image dataset with the image processor to produce a computed contrast-enhanced medical image, wherein the image processor comprises a machine learning processor trained on a training dataset comprising sets of images, each set of images comprising a contrast agent-free quantitative mapping image having the same quantitative mapping as the quantitative mapping image of the image dataset and a corresponding acquired contrast-enhanced medical image, wherein the image dataset of the subject further comprises at least one non-magnetic resonance image, and the sets of images of the training dataset further comprise at least one non-magnetic resonance image of the same type as the at least one non-magnetic resonance image of the image dataset.

6. A method according to claim 5, wherein the at least one non-magnetic resonance image comprises at least one of: an echocardiogram, a nuclear perfusion image, a CT image, an electrophysiological cardiac map image, or a chest X-ray.

7. A method of producing a computed contrast-enhanced medical image, the method comprising:

receiving an image dataset of a subject comprising a native quantitative mapping image obtained by performing a contrast agent-free magnetic resonance imaging procedure; and inputting the image dataset to an image processor and processing the image dataset with the image processor to produce a computed contrast-enhanced medical image, wherein the image processor comprises a machine learning processor trained on a training dataset comprising sets of images, each set of images comprising a contrast agent-free quantitative mapping image having the same quantitative mapping as the quantitative mapping image of the image dataset and a corresponding acquired contrast-enhanced medical image, wherein the image dataset comprises further data that is not image data, and the training dataset comprises further training data associated with each set of images of the same type as the further data that is not image data.

8. A method according to claim 7, wherein the further data comprises at least one of: imaging metadata, image acquisition parameters, or a non-imaging diagnostic test result.

9. A method according to claim 8, wherein the non-imaging diagnostic test result is at least one of: a MR spectroscopy result, a blood test result, an electrocardiogram, the subject's clinical characteristics, or the subject's reason for referral.

10. A method of producing a computed contrast-enhanced medical image, the method comprising:

receiving an image dataset of a subject comprising a native quantitative mapping image obtained by performing a contrast agent-free magnetic resonance imaging procedure; and inputting the image dataset to an image processor and processing the image dataset with the image processor to produce a computed contrast-enhanced medical image, wherein the image processor comprises a machine learning processor trained on a training dataset comprising sets of images, each set of images comprising a contrast agent-free quantitative mapping image having the same quantitative mapping as the quantitative mapping image of the image dataset and a corresponding acquired contrast-enhanced medical image, and wherein the image dataset is processed with the image processor to produce plural computed contrast-enhanced medical images having different disease sensitivity, and the method further comprises combining the plural multiple plural computed contrast-enhanced medical images to produce a combined, computed contrast-enhanced medical image.

11. An image processor adapted to produce a computed contrast-enhanced medical image, the image processor comprising:

an input for receiving an image dataset of a subject comprising a quantitative mapping image obtained by performing a contrast agent-free magnetic resonance imaging procedure; and a data processor for processing the image dataset to produce a computed contrast-enhanced medical image, wherein the data processor comprises a machine learning processor trained on a training dataset comprising sets of images, each set of images comprising a contrast agent-free native quantitative mapping image having the same quantitative mapping as the quantitative mapping image of the image dataset and a corresponding acquired contrast-enhanced medical image, wherein the image dataset of the subject further comprises at least one further magnetic resonance image obtained by a contrast agent-free magnetic resonance modality other than the quantitative mapping of the quantitative mapping image of the image dataset, and the sets of images of the training dataset further comprise at least one further magnetic resonance image obtained by the other contrast agent-free magnetic resonance modality.

12. An image processor according to claim 11, wherein the at least one further magnetic resonance image comprises at least one of: a T1 mapping image, a T1-weighted image, a T2 weighted image, a T2*-weighted image, a T2 mapping image, a T2* mapping image, or a cine CMR image.

13. An image processor according to claim 11, wherein the at least one further magnetic resonance image comprises at least one of: a STIR image, a tagged-CMR image, a strain-encoded image, a diffusion-weighted image, a diffusion tensor image, an arterial spin labelling image, a PD weighted image, or a fat-water separated image.

14. An image processor adapted to produce a computed contrast-enhanced medical image, the image processor comprising:

an input for receiving an image dataset of a subject comprising a quantitative mapping image obtained by performing a contrast agent-free magnetic resonance imaging procedure; and a data processor for processing the image dataset to produce a computed contrast-enhanced medical image, wherein the data processor comprises a machine learning processor trained on a training dataset comprising sets of images, each set of images comprising a contrast agent-free native quantitative mapping image having the same quantitative mapping as the quantitative mapping image of the image dataset and a corresponding acquired contrast-enhanced medical image, wherein the image dataset of the subject further comprises at least one non-magnetic resonance image, and the sets of images of the training dataset further comprise at least one non-magnetic resonance image of the same type as the at least one non-magnetic resonance image of the image dataset.

15. An image processor according to claim 14, wherein the at least one non-magnetic resonance image comprises at least one of: an echocardiogram, a nuclear perfusion image, a CT image, an electrophysiological cardiac map, or a chest X-ray.

16. An image processor adapted to produce a computed contrast-enhanced medical image, the image processor comprising:
   an input for receiving an image dataset of a subject comprising a quantitative mapping image obtained by performing a contrast agent-free magnetic resonance imaging procedure; and
   a data processor for processing the image dataset to produce a computed contrast-enhanced medical image, wherein the data processor comprises a machine learning processor trained on a training dataset comprising sets of images, each set of images comprising a contrast agent-free native quantitative mapping image having the same quantitative mapping as the quantitative mapping image of the image dataset and a corresponding acquired contrast-enhanced medical image,
   wherein the image dataset comprises further data that is not image data, and the training dataset comprises further training data associated with each set of images of the same type as the further data that is not image data.

17. An image processor according to claim 16, wherein the further data comprises at least one of: imaging metadata, image acquisition parameters, or a non-imaging diagnostic test.

18. An image processor according to claim 17, wherein the non-imaging diagnostic test result is, at least one of: a MR spectroscopy result, a blood test result, an electrocardiogram, the subject's clinical characteristics, or the subject's reason for referral.

* * * * *